(12) United States Patent
Badros

(10) Patent No.: US 12,213,032 B2
(45) Date of Patent: Jan. 28, 2025

(54) MESSAGING-BASED LOGGING AND ALERTING SYSTEM

(71) Applicant: Gluroo Imaginations, Inc., Los Altos Hills, CA (US)

(72) Inventor: Gregory J. Badros, Los Altos Hills, CA (US)

(73) Assignee: Gluroo Imaginations, Inc., Los Altos Hills, CA (US)

( * ) Notice: Subject to any disclaimer, the term of this patent is extended or adjusted under 35 U.S.C. 154(b) by 351 days.

(21) Appl. No.: 17/573,016

(22) Filed: Jan. 11, 2022

(65) Prior Publication Data

US 2022/0232353 A1 Jul. 21, 2022

Related U.S. Application Data

(60) Provisional application No. 63/218,611, filed on Jul. 6, 2021, provisional application No. 63/138,900, filed on Jan. 19, 2021.

(51) Int. Cl.
*H04W 4/14* (2009.01)
*G06F 16/23* (2019.01)
(Continued)

(52) U.S. Cl.
CPC .......... *H04W 4/14* (2013.01); *G06F 16/2358* (2019.01); *G06F 16/243* (2019.01); *G06F 40/20* (2020.01);
(Continued)

(58) Field of Classification Search
CPC .......... H04W 4/14; H04W 4/38; H04W 4/70; H04W 4/80; G06F 16/2358; G06F 16/243;
(Continued)

(56) References Cited

U.S. PATENT DOCUMENTS 9,311,386 B1 * 4/2016 Song .................. G06F 16/3323
10,812,424 B1 * 10/2020 Bommaraju ........... G06N 20/00
(Continued)

FOREIGN PATENT DOCUMENTS

WO WO-2020063431 A1 * 4/2020 ..... G06Q 10/063114

OTHER PUBLICATIONS

Ongenae, F., Famaey, J., Verstichel, S., De Zutter, S., Latre, S., Ackaert, A., . . . De Turck, F. (2014). Ambient-aware continuous care through semantic context dissemination. BMC Medical Informatics and Decision Making, 14, 97. doi:http://dx.doi.org/10.1186/1472-6947-14-97 (Year: 2014).*

(Continued)

*Primary Examiner* — Yuwen Pan
*Assistant Examiner* — Swati Jain
(74) *Attorney, Agent, or Firm* — PERKINS COIE LLP; Michael A. Glenn

(57) ABSTRACT

A single- or multiple-user messaging-based logging system automatically incorporates external data and ensures that every communication has complete metadata of relevant metrics, enables easy real-time visualization and reflection on those metrics, and ensures that the structured log entry is recorded by understanding the natural communication (text, voice, images, etc.) among participants without requiring a separate step of logging the action. In embodiments, one or more devices are alerted immediately based on which caregivers are predicted via sensors and automatic and manual configurations are most likely to be able to meaningfully and quickly correct the alertable condition. Embodiments also leverage feedback about the correction of the alertable condition to terminate alerts on other devices or feedback about the non-correction of the alertable condition to reassign and escalate an alert to other devices and caregivers (Continued)

10. Provide alerting to call attention to situations that may require intervention or interaction.

11. Automatically create log entries from system(s) on behalf of the participants These messages are introduced into the log automatically by a connection to an Insulin Pump's Personal Diabetes Manager (PDM)

for them to have a follow-up chance to correct the alertable condition.

28 Claims, 41 Drawing Sheets

(51) Int. Cl.
| | |
|---|---|
| *G06F 16/242* | (2019.01) |
| *G06F 40/20* | (2020.01) |
| *G10L 15/26* | (2006.01) |
| *H04W 4/38* | (2018.01) |
| *H04W 4/70* | (2018.01) |
| *H04W 4/80* | (2018.01) |

(52) U.S. Cl.
CPC .............. *G10L 15/26* (2013.01); *H04W 4/38* (2018.02); *H04W 4/70* (2018.02); *H04W 4/80* (2018.02)

(58) Field of Classification Search
CPC .. G06F 40/20; G06F 16/9535; G06F 16/9538; G10L 15/26
See application file for complete search history.

(56) References Cited

U.S. PATENT DOCUMENTS

| | | | | |
|---|---|---|---|---|
| 11,109,110 | B2* | 8/2021 | Wang | H04N 21/42203 |
| 11,341,962 | B2* | 5/2022 | Poltorak | G06F 3/167 |
| 11,395,109 | B2* | 7/2022 | Harijan | H04W 4/12 |
| 11,417,429 | B2* | 8/2022 | Hanlon, Jr | G16H 50/20 |
| 11,430,570 | B2* | 8/2022 | Tee | G06F 21/6245 |
| 11,880,665 | B2* | 1/2024 | Aher | G06F 16/3329 |
| 11,922,934 | B2* | 3/2024 | Luan | G10L 15/22 |
| 12,046,238 | B2* | 7/2024 | Khaleghi | G06V 40/168 |
| 12,067,628 | B1* | 8/2024 | Greene | H04L 63/10 |
| 12,080,406 | B2* | 9/2024 | Smith | G16H 20/40 |
| 2002/0042725 | A1* | 4/2002 | Mayaud | G16H 20/13 |
| | | | | 705/2 |
| 2002/0042726 | A1* | 4/2002 | Mayaud | G06Q 40/08 |
| | | | | 705/2 |
| 2004/0249250 | A1* | 12/2004 | McGee | G16H 20/10 |
| | | | | 600/300 |
| 2005/0108573 | A1* | 5/2005 | Bennett | G06F 11/3048 |
| | | | | 709/224 |
| 2007/0286169 | A1* | 12/2007 | Roman | H04L 12/66 |
| | | | | 370/352 |
| 2008/0152122 | A1* | 6/2008 | Idan | H04M 3/5175 |
| | | | | 379/265.07 |
| 2011/0296244 | A1* | 12/2011 | Fu | G06F 11/3608 |
| | | | | 714/E11.029 |
| 2012/0022997 | A1* | 1/2012 | Vasinkevich | G06Q 40/04 |
| | | | | 705/37 |
| 2012/0079021 | A1* | 3/2012 | Roman | H04W 4/21 |
| | | | | 709/204 |
| 2012/0137367 | A1* | 5/2012 | Dupont | G06F 21/00 |
| | | | | 726/25 |
| 2012/0233013 | A1* | 9/2012 | Smith | G06Q 40/00 |
| | | | | 705/26.5 |
| 2013/0173495 | A1* | 7/2013 | Davidsohn | G06Q 40/06 |
| | | | | 705/37 |
| 2013/0173652 | A1* | 7/2013 | Woods | G06F 16/245 |
| | | | | 707/769 |
| 2015/0227598 | A1* | 8/2015 | Hahn | G06F 16/11 |
| | | | | 707/737 |
| 2016/0247227 | A1* | 8/2016 | Dalal | G06Q 40/06 |
| 2016/0306777 | A1* | 10/2016 | George | G06Q 10/06 |
| 2016/0351070 | A1* | 12/2016 | Aillon-Sohl | G16H 20/70 |
| 2018/0181720 | A1* | 6/2018 | Ensey | G16H 50/20 |
| 2018/0205692 | A1* | 7/2018 | Zunger | G06Q 10/107 |
| 2018/0349482 | A1* | 12/2018 | Oliner | G06F 16/38 |
| 2019/0034403 | A1* | 1/2019 | Pal | G06F 40/194 |
| 2019/0163678 | A1* | 5/2019 | Bath | H04L 67/02 |
| 2020/0250758 | A1* | 8/2020 | Tokarsky | G06Q 50/01 |
| 2021/0142872 | A1* | 5/2021 | Klein | G16H 10/20 |
| 2021/0182297 | A1* | 6/2021 | Seshadri | G06F 16/2455 |
| 2021/0201144 | A1* | 7/2021 | Jonnalagadda | G06N 3/08 |
| 2021/0219874 | A1* | 7/2021 | Coyle | G16H 20/30 |
| 2021/0248195 | A1* | 8/2021 | Okajima | G06F 16/9532 |
| 2021/0248564 | A1* | 8/2021 | Sreedhara | H04N 21/25841 |
| 2021/0264764 | A1* | 8/2021 | Glynn | G08B 25/016 |
| 2021/0306200 | A1* | 9/2021 | Tee | H04L 41/0631 |
| 2021/0358627 | A1* | 11/2021 | Longmire | G16H 10/65 |
| 2023/0019375 | A1* | 1/2023 | Ohnemus | G16H 20/70 |
| 2023/0040562 | A1* | 2/2023 | Boivin | A61B 5/163 |
| 2023/0114515 | A1* | 4/2023 | Tee | G16H 80/00 |
| | | | | 705/3 |
| 2023/0223126 | A1* | 7/2023 | Eberting | G06Q 30/0601 |
| | | | | 705/2 |
| 2023/0421515 | A1* | 12/2023 | Ramirez | H04L 63/104 |
| 2024/0022881 | A1* | 1/2024 | Harijan | G06Q 10/107 |
| 2024/0046223 | A1* | 2/2024 | Sreedhara | G06Q 10/1095 |
| 2024/0115211 | A1* | 4/2024 | Cabrera, Jr. | G16H 40/63 |
| 2024/0134506 | A1* | 4/2024 | Napolitano | H04N 21/47 |

OTHER PUBLICATIONS

Dwaraki, A., Kumary, S., & Wolf, T. (2020). Automated event identification from system logs using natural language processing doi:http://dx.doi.org/10.1109/ICNC47757.2020.9049823 (Year: 2020).*
Sundaram, H., Xie, L., De Choudhury, M., Lin, Y., & Natsev, A. (2012). Multimedia semantics: Interactions between content and community. IEEE Proceedings, 100(9), 2737-2758. doi:http://dx.doi.org/10.1109/JPROC.2012.2191529 (Year: 2012).*
Funk B, Sadeh-Sharvit S et al., A Framework for Applying Natural Language Processing in Digital Health Interventions J Med Internet Res 2020; 22(2):e13855, doi: 10.2196/13855 (Year: 2020).*

* cited by examiner

1. Identify participants (sign-up, email/text invitations, QR scanning, etc.)

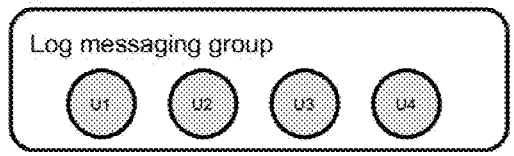
Log messaging group (Users shown in a single group, but each user can be included in and participate in more than one group.)

2.

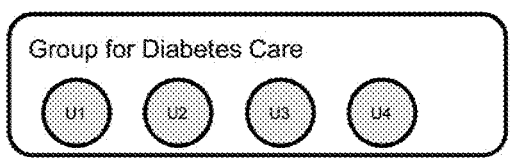
Group for Diabetes Care

Sensors attached:

Continuous Glucose Monitor Readings

Finger-prick bluetooth sensor Readings

Watch-based pedometer Readings

Group for Stock Tracking

Sensors attached:

Stock price

Group for System Operations

Sensors attached:

Incoming query rate

CPU Load Readings

FIGURE 1

10. Provide alerting to call attention to situations that may require intervention or interaction.
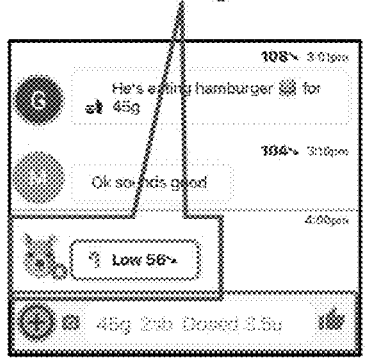
11. Automatically create log entries from system(s) on behalf of the participants
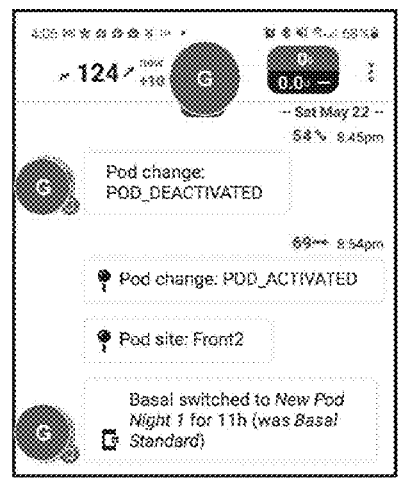
These messages are introduced into the log automatically by a connection to an Insulin Pump's Personal Diabetes Manager (PDM)
FIGURE 6

Candidate alerting conditions

1. Alertable conditions requiring attention    $A_1$   $A_2$   $\cdots$   $A_m$

Without loss of generality, take a single such alertable condition and call it "A"

2. Possible users and devices

| User 1 has 2 devices | User 2 has 3 devices | User 3 has 2 devices |
|---|---|---|
| U1: D11, D12 | U2: D21, D22, D23 | U3: D31, 32 |

Available users and devices

| User 1's 2nd device is off | User 2 GPS says she is out of state | User 3 calendar is free And used both recently |
|---|---|---|
| U1: D11, ~~D12~~ | ~~U2~~: D21, D22, D23 | U3: D31, D32 |

3. Filtered list of users and devices    { U1's D11, U3's D31, U3's D32 }

E.g., U3 is closer to the problem,
Has used D31 more recently than D32

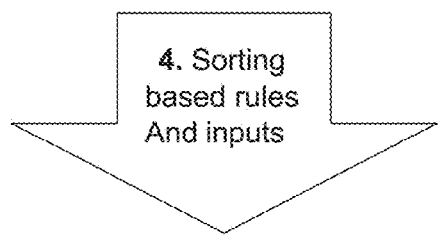

4. Sorting based rules And inputs

Partially Ordered list of user devices    U3's D31 → U1's D11 → U3's D32
(i.e., multiple devices could be equal in order)

5. Alert U3's D31 (could be multiple devices)

Handled?

7. Turn off alert A everywhere

6. Explicitly passed or timeout without correction by that user?

6b. Move U3's D31 to end of list and continue with U1's D11 (next in list)

FIGURE 8

MESSAGING-BASED LOGGING AND ALERTING SYSTEM

CROSS-REFERENCE TO RELATED APPLICATIONS

This application claims the benefit of U.S. provisional patent application Nos. 63/138,900, filed Jan. 19, 2021, and 63/218,611, filed Jul. 6, 2021, each of which is incorporated herein in its entirety by this reference thereto.

TECHNICAL FIELD

Embodiments of the invention relate generally to a single- or multiple-user messaging-based logging system that automatically incorporates external data. Other embodiments of the invention relate to a method for health care alerting for multiple caregivers that leverages sensor data and configured or learned rules.

BACKGROUND

Logging Systems

Keeping a log or diary of actions taken while managing a system, such as but not limited to one or more individuals' medical or health needs, a production line operation, a software execution environment, a biological ecosystem such as a garden or biosphere, a research process or experiment, or financial or commodity market collaboration and coordination, is often a complex coordination task among multiple individuals or entities. In many cases, there exist one or more important metrics, numeric or qualitative, that are available automatically and that inform the coordination process, e.g.:

1) For health care and fitness: a continuous blood pressure monitor (BPM), continuous glucose monitor (CGM), heart rate monitor, step tracker, etc.;
2) For a software execution environment: the processing load, the memory utilized, incoming queries per unit time, tasks completed per unit time, average size of task, etc.;
3) For financial or commodity markets: the bid/ask prices of the asset and of related assets, the trading volume, mentions in the news or press, etc.

One approach to solving this problem involves using messaging among the human participants to coordinate and communicate among them, but the state of the practice is one where they manually introduce and discuss the relevant metrics. This approach is tedious and error prone and can result in suboptimal decisions due to either the lack of information because it requires manual entry, or the precision of information because of data errors during that manual entry. Typically, the only metadata associated with a message is the identity of the sender and a timestamp.

Furthermore, logging is sometimes viewed as a chore and as a secondary activity over the human-understood communication, and thus the logging aspect of the conversation takes a secondary role over the human-understood interactions thus leaving the logs incomplete or imprecise. This reduces the value of those logs for future data mining and learning uses.

Existing systems are not unified. Messaging is separate from logging, so participants do double the work, e.g. telling others what they're doing and separately entering a log entry into a distinct system. Furthermore, the messages lack context or lack correct context of meaningful and relevant metrics of interest.

Alerting Systems

Existing alerting, for example for health-related concerns such as low or high blood glucose readings, may warn only a single individual, thus under-communicating when there are other parties who may be able to facilitate a correction of the alertable condition. Other systems may alert multiple individuals simultaneously, thus diluting the urgency of the alert and disrupting parties who are unable or less-well-positioned to facilitate a correction of the alertable condition. Neither of these approaches is ideal.

Some existing systems have individual controls for a user to limit alerts right now, e.g. Do Not Disturb mode on a mobile phone, or to alert the behavior of alerting on a single device based on a schedule. None of the existing solutions address the shared manual or automatic configuration across multiple devices, none use sensors across multiple devices to infer the best recipient of an alert, and none use feedback about actions taken to correct the alertable condition to inform alerts on other devices.

SUMMARY

Embodiments of the invention provide every communication message with complete metadata of relevant metrics, enable easy real-time visualization and reflection on those metrics in the context of the messages, and automatically logs structured entries by understanding the natural communication, text, voice, images, etc., among participants without requiring a separate step of logging the action.

Other embodiments of the invention alert one or more devices immediately, for example based on which caregivers are predicted via sensors and which automatic and manual configurations are most likely to meaningfully and quickly correct the alertable condition. Embodiments also leverage feedback about the correction of the alertable condition to terminate alerts on other devices or feedback about the non-correction of the alertable condition to re-assign and escalate an alert to other devices and caregivers for them to have a follow-up chance to correct the alertable condition.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 1 shows message-based logging by group according to one or more embodiments of the invention;

FIG. 6 shows alerting according to one or more embodiments of the invention;

FIG. 8 shows candidate alerting conditions according to one or more embodiments of the invention.

DETAILED DESCRIPTION

Figure 2:
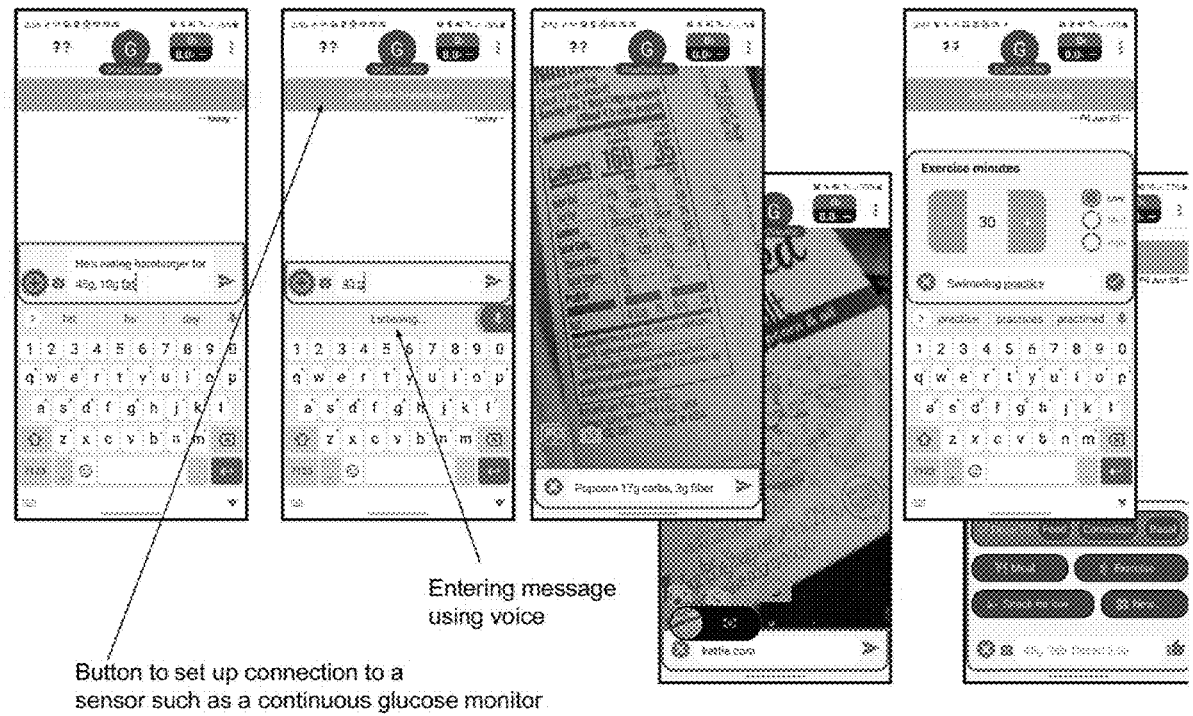
FIG. 2 shows participant messaging according to one or more embodiments of the invention.

In the following description, for the purposes of explanation, numerous specific details are set forth to provide a thorough understanding of the present embodiments. It will be apparent, however, that the present embodiments may be practiced without these specific details.

Logging Systems

Embodiments of the invention integrate various metrics relevant to the system being managed or coordinated directly into the shared communication channel among the participants. In embodiments of the invention, each message is annotated with one or more of the relevant metrics and/or derivative data about those metrics, e.g. whether a blood pressure or blood glucose reading is in range, how a query rate compares to historical averages, moving averages of stock prices, etc. Additionally, the logging system may make readily available time-coordinated charts of those metrics available directly in-line and interleaved with the messaging system. Those metrics provide context for the real-time status of the system and the coordination and communication around it.

Furthermore, embodiments of the invention use natural language processing (text and/or voice), image recognition, image analysis, optical character recognition, and related technologies to extract meaningful logging information automatically from the natural communication, e.g. text, photos, and other interactions, among the participants in the conversation. Embodiments also provide a direct graphical interaction mechanism for entering log data as well that allows precise structured specification of state or of an interaction or change of state and turns those explicitly structured entries into human-readable natural language messages shared with the other participants.

Embodiments of the invention also use various prediction techniques to make available predictive values of metrics' values in the future and enable coordinated alerting and visualizing of those simulations or predictions. Such prediction techniques include, for example, linear regression, multiple regression, symbolic regression and other mathematical techniques; neural networks, convolutional neural networks, deep-learning, and other machine learning techniques including physically and/or biologically modeled learning approaches that mix understood causal relationships with learned parameters.

Embodiments of the invention automatically add relevant domain-specific metadata to every message and make those metrics available visually in-line with the messages themselves, thereby avoiding transcription errors and omission errors in recording the relevant state of the world that provides context to the messages, e.g. instead of having to read a sensor value from one screen and type it into another, embodiments of the invention ensure a direct integration of the value via standard Web or local electronic protocols such as HTTP or Bluetooth. By automatically understanding messages, images, voice, etc. of the messaging interactions among one or more individuals or entities, embodiments of the invention extract log and/or diary entries from the ad-hoc informal communications that are naturally provided by communicating with the other participants. Those communications may involve shorthand learned by or taught to the system by the participants, e.g. "1 sb" means "1 starburst was eaten by the patient." Those communications may also allow a command language for changing other external state of the system, e.g. "Update carb ratio to 22 g" to change an insulin-treated diabetic's current prescription.

Because the work is not unified in the state of the art, log entries and the communication can be imprecise and even contradictory. Oftentimes the requirement to enter the structured action separately from the communication means that it is never entered, i.e. the structured log entry is forgotten, or the reverse, i.e. the structured log entry is made but it is not communicated properly to the other participants. Embodiments of the invention improve upon the state of the art by unifying the log entries and the communication activities, thus avoiding those problems.

Because the relevant metrics are not available with each message in the state of the art, important context is missing that can help explain behaviors. That context is essential in debriefs or post-mortems to understand retrospectively the behaviors and actions to learn from them from the future. Embodiments of the invention improve upon the state of the art by automatically entering the relevant metrics as annotations on every message, or optionally a subset of messages.

Embodiments of the invention ensure that every communication has complete, or optionally a subset of, metadata of relevant metrics, enable easy real-time visualization and reflection on those metrics, and ensure that the structured log entry is recorded by understanding the natural communication (text, voice, images, etc.) among participants without requiring a separate step of logging the action. Using a Natural Language Processing (NLP) engine that is either grammar-, regular-expression-, or machine-learned, or some combination of those, messages such as "56 g bagel" can be understood to be an announcement of eating a bagel with an estimated 56 g of carbohydrate content where the structured entry includes a mapping of "carb-content" to "56 grams." Multiple semantic keys may be recorded including—for the diet/food use case—carb content, fat content, protein content, insulin dose, exercise-minutes, exercise-strenuousness, etc. The engine also categorizes and understands questions vs. statements so "Should I eat 40 g bagel?" is understood by embodiments of the invention to be a question and not a statement of eating the bagel.

Embodiments of the invention produce a standalone messaging/chat application that integrates the steps described herein and runs on desktops, laptops, browsers, televisions, smart speakers, mobile phones, tablets, watches, or other electronic devices. Alternatively, embodiments of the invention produce a chatbot that is integrated into any form of electronic device or messaging application via an API (Application Programming Interface) and that embeds the process described hereinbelow to respond to messages/chats on that platform.

FIG. 1 shows message-based logging by group according to the invention. In FIG. 1, the following steps are shown:
1. Identify one or more participants U1-U4, to the logging system, i.e. the log messaging group, e.g. by sign-up, email/text invitation, QR scanning, etc. In FIG. 1, uses are shown in a single group, but each user can be included in and participate in more than one group.
2. Identify one or more metrics to be associated with the messages and the coordination, e.g. a group for diabetes care having attached sensors that include, for example continuous glucose monitor readings, fingerprick Bluetooth sensor readings, and watch-based pedometer readings; a group for stock trading having attached sensors that include, for example stock price; and a group for system operations having attached sensors that include, for example incoming query rate and CPU load readings.

FIG. 2 shows participant messaging according to the invention. In FIG. 2, the following step is shown:
3. Allow a participant to enter a message via any or all of text, voice, image/photo, device sensor, or structured data to be shared with the participants. Embodiments of the invention include, for example a button to set up a connection to a sensor, such as a continuous glucose monitor (CGM), that allows entering a message using voice.

Figure 3:
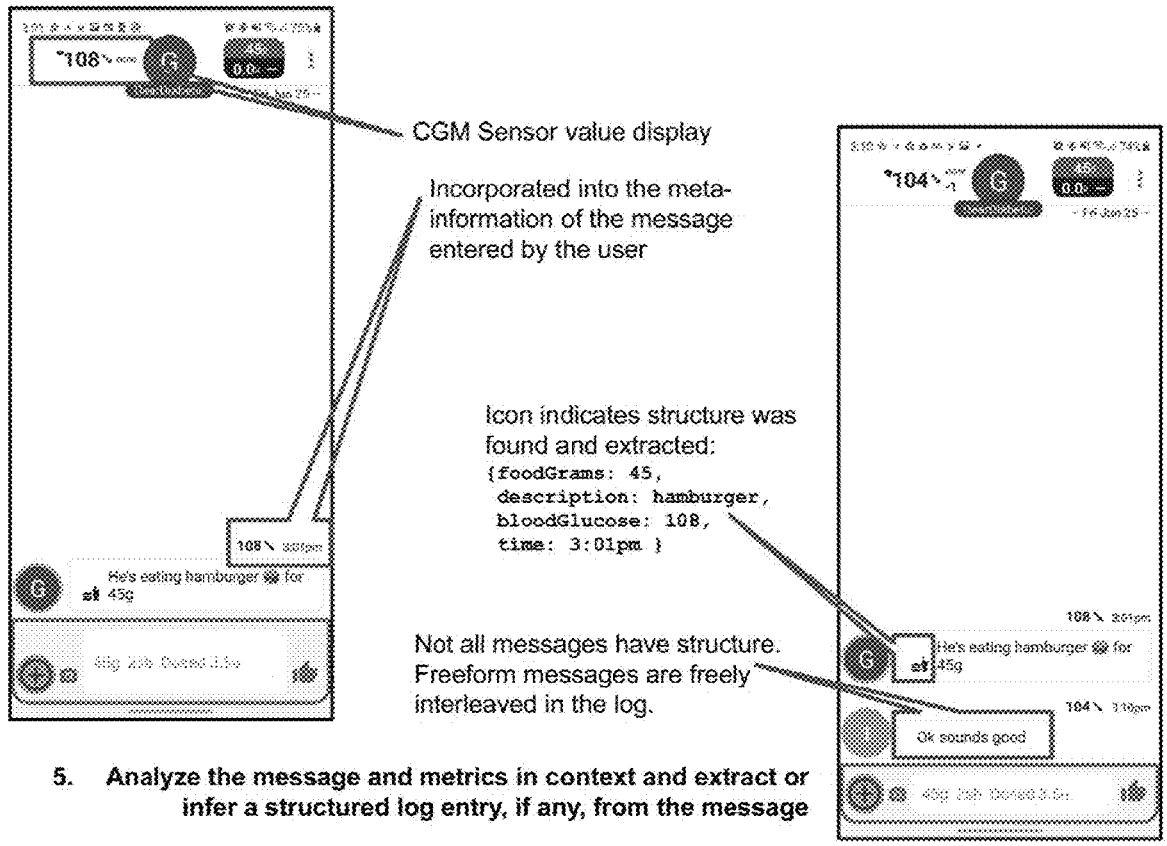
FIG. 3 shows message augmentation according to one or more embodiments of the invention.

FIG. 3 shows message augmentation according to the invention. In FIG. 3, the following steps are shown:
4. Augment that message, or optionally a subset of messages, with timely and contextually relevant metrics from step 2 above. For example, the value in a CGM sensor value display is incorporated into the metadata of the message entered by the user.
5. Analyze the message and the metrics in context and extract or infer a structured log entry, if any, from the message. For example, in embodiments of the invention an icon indicates that a structure was found and extracted, e.g. {foodGrams: 45, description: hamburger, blood Glucose: 108, time: "3:01 pm" }. Note that not all messages have structure. Freeform messages are freely interleaved in the log.

Figure 4:
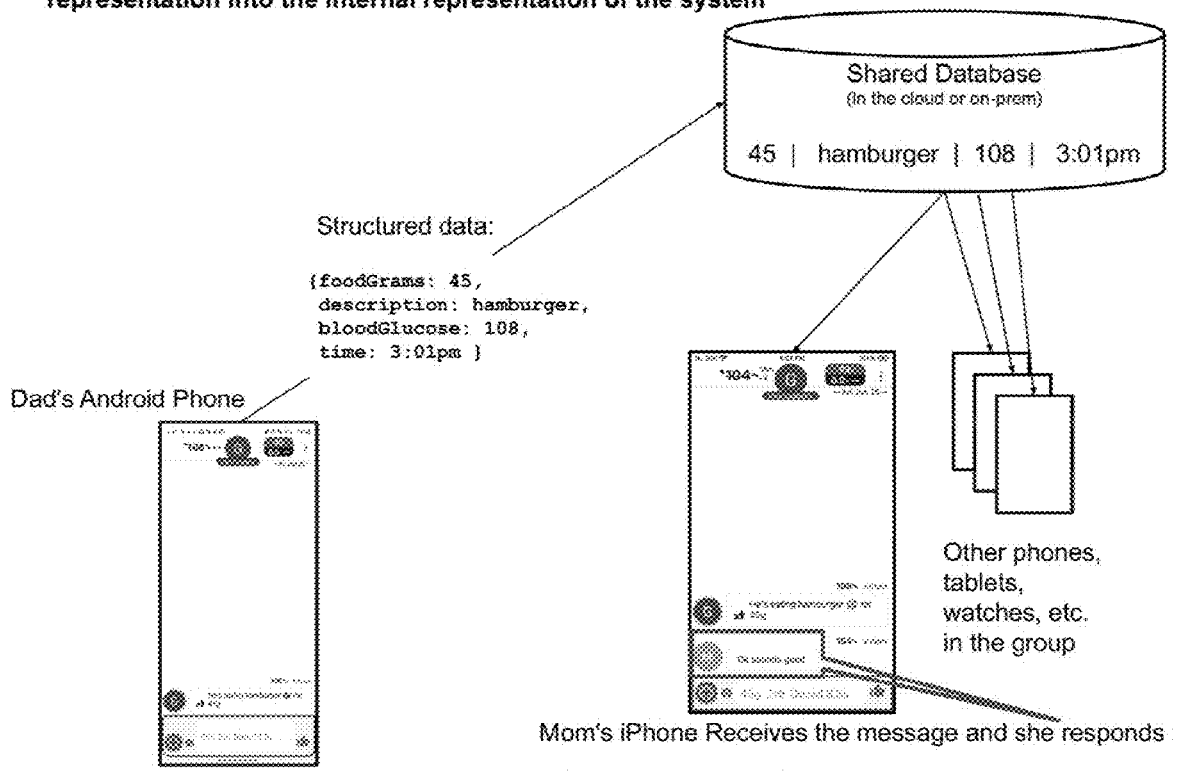
FIG. 4 shows structured data according to one or more embodiments of the invention.

FIG. 4 shows structured data according to the invention. In FIG. 4, the following steps are shown:
6. Incorporate the message, its metadata and metrics, and the structured log entry into the internal representation of the system. For example, a shared database, in the cloud or on-premises, collects metadata, e.g. from Dad's android phone {foodGrams: 45, description: hamburger, blood Glucose: 108, time: "3:01 pm" }.
7. Share the message, its metadata and metrics, and its structured representation with the other participants (or optionally a subset of those participants) in message and structured formats. For example, Mom's iPhone receives the message, and she responds. Other phones, tablets, watches, etc. in the group may also receive this information.

Figure 5:
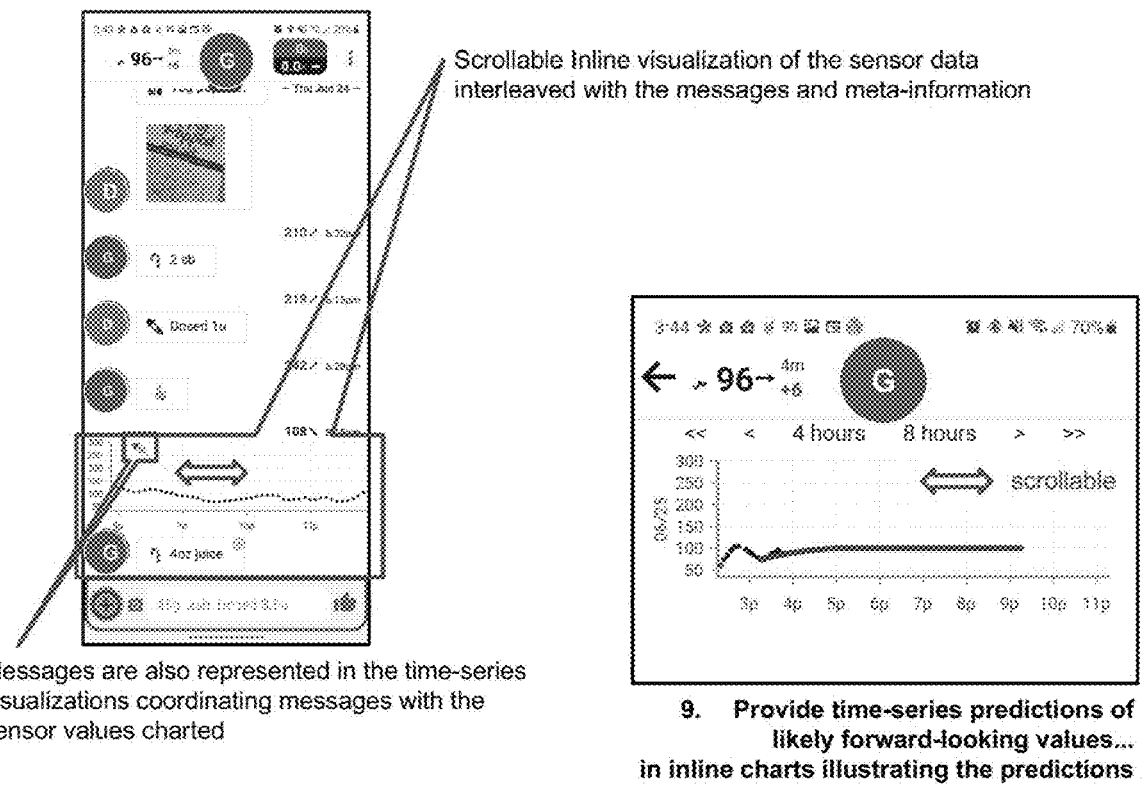
FIG. 5 shows real time visualization according to one or more embodiments of the invention.

FIG. 5 shows real time visualization according to the invention. In FIG. 5, the following steps are shown:
8. Enable inline real-time visualization of those data for each participant. In embodiments of the invention, scrollable inline visualization of the sensor data is interleaved with the messages and metadata. Messages may also be represented in the time-series visualizations to coordinate message with the senor values charted.
9. Provide time-series predictions of likely forward-looking values for the relevant metrics and allow participants to scroll backwards and forwards through the inline charts illustrating those predictions.

FIG. 6 shows alerting according to the invention. In FIG. 6, the following steps are shown:

10. Provide alerting to call attention to situations that may require intervention or interaction.
11. Automatically create log entries from the system itself on behalf of the participants, either attributed to the participants or attributed to the system. For example, in embodiments of the invention these messages are introduced into the log automatically by a connection to an insulin pump's Personal Diabetes Manager (PDM).

Figure 7:
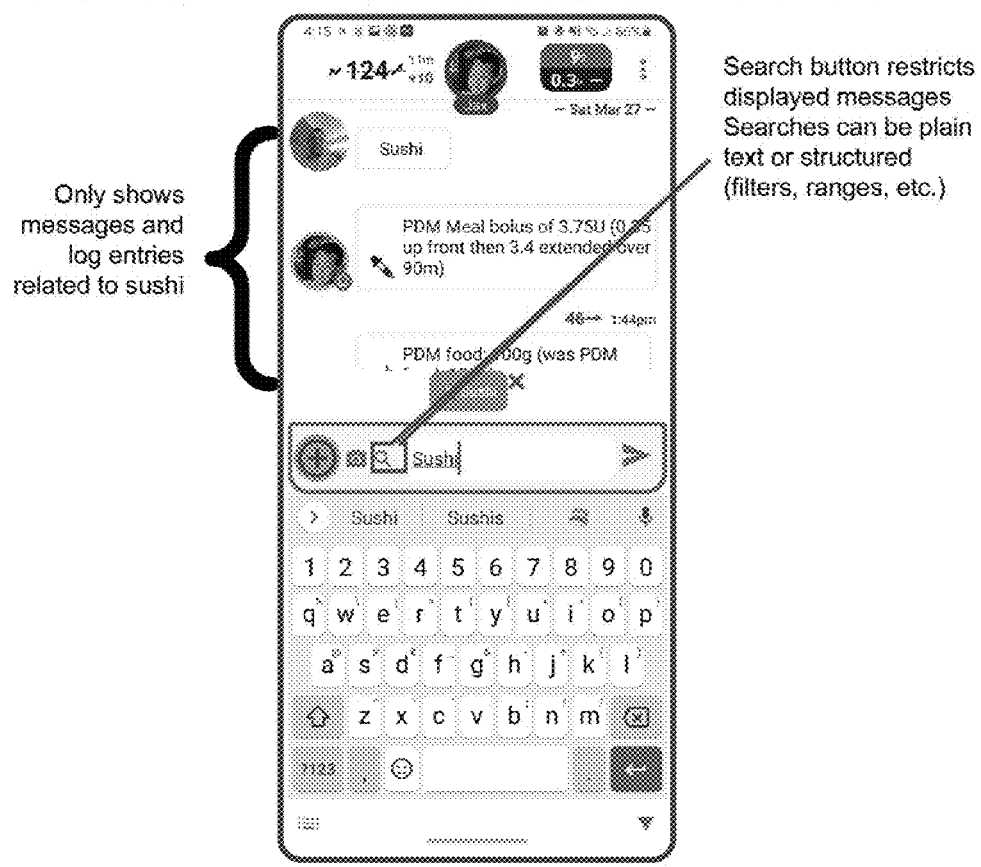
FIG. 7 shows searching of structured and unstructured data according to one or more embodiments of the invention.

FIG. 7 shows searching of structured and unstructured data according to the invention. In FIG. 7, the following step is shown:

12. Provide search over the structured and unstructured data to permit finding of similar contexts in the past to use to compare outcomes or inform reactions. For example, in embodiments of the invention a search button restricts displayed messages. Searches can be plain text or structured, e.g. via filters, ranges, etc. Thus, in FIG. 7, the search only shows messages and log entries related to sushi.

The steps shown in FIGS. 1-7 coordinate interactions via peer-to-peer communication or via a centralized broker service. Such interactions use standard and proprietary network interactions including HTTP/REST, HTTP/JSON, HTTP/GraphQL, or other framing mechanisms over TCP/UDP connections or other low-level internetworking protocols. Each participant may have one or more devices, including but not limited to, mobile phones, electronic tablets, desktop computers, watches, or Web technology browsers on any type of hardware, to serve as the input and viewing/consumption mechanism for these interactions. Those skilled in the art will appreciate that any combination of the steps shown in FIGS. 1-7 may be incorporated into the various embodiments of the invention and that, therefore, it is not necessary to use each step to practice the invention.

Metrics are collected by a collection system. The most recent reading or readings are stored in a real-time dictionary so that they can be added to each new message based on temporal proximity. As a sensor reading is collected by either the server-side components or the client-side application, the reading is associated with the time that it was recorded, either as collected by the collection system or based on the wall-clock time of the collector as it receives the reading. Then a simple lookup in the dictionary for the most recent reading on or after the time a message is sent is used to provide extra contextual metrics to the message as it is recorded and then displayed together with the message content.

Messages (text, voice, image, sensor, or structured) are analyzed using a variety of techniques including regular expressions, language models including part of speech taggers and other techniques, image analysis using artificial intelligence and machine learning including deep learning algorithms, and domain-specific graphical user interfaces customized for collecting the relevant structured and unstructured data. In embodiments of the invention, many of these advanced analyses techniques may be provided by third-party APIs integrated therein or they may be implemented directly by the system.

Predictions/simulations are performed by biological or time-forecast models with parameters learned from historical data, various time-series forecasting techniques, pattern recognition and error minimization curve-fitting techniques, and similar technologies.

Embodiments of the invention do not require all the different forms of input to be complete. For example, embodiments of the invention are complete as a messaging application that allows taking and sharing of photos that are analyzed and logged or only text or only voice. Any combination of the different input mechanisms, including all of them together, can also create the invention.

One or more automatically added metrics or one or more rules for automatically inferring a structured message from natural language or an image is required. For example, a simple embodiment of the invention matches against the regular expression: /(\d+)\s*g\s+(\d+)/ and uses the first captured parenthesis group as the number of grams of food and the second captured parenthesis group as the kind of food. Similarly, matching against a regular expression for a message ending in a "?" is used to determine if the message was a question. Some of the captured groups might be optional to allow extracting multiple numeric parameters and a richer structured message from a single sentence. For an image, on-device or cloud-API vision/image recognition algorithms or services may be employed with the image that is the message or that accompanies the message to extract structure from tables appearing in the image, e.g. a nutrition or marketing label giving the details of the content of a food for a given serving size, and other labels may be added to facilitate improved search over the structured messages.

Embodiments of the invention might not perform all the operations of a basic messaging application.

In embodiments of the invention, alerting happens via manual rules entered by the system or by any of the participants. A message tagged with an @PersonName reference may automatically trigger a notification on just that person's device, or an individual may configure their application to show notifications for any new message appearing in the log.

Alerting may also happen completely automatically without participant intervention or system provisioning. Alerting may also happen via a mix of those two approaches. For example, the system constantly updates its estimates and predictions about the various important metrics are for the user. For example, in a healthcare situation where blood glucose is being measured, a new message announcing 60 grams of food results in an updated estimate that expects that the forthcoming blood glucose level will go up 200 or more mg/dL, resulting in a peremptory alert of possible high blood glucose long before the blood glucose reading from a sensor is above the desired range. Users may control the target range outside of which alerting occurs. The adaptive alerts may get shut off when corrective action is taken and recorded in the log. For example, in the case of a high blood glucose, recording an appropriate dose of insulin may silence the alert because embodiments of the invention incorporate that insulin into the model that estimates the future blood glucose sensor numbers.

The system itself may provide most of the structured log data automatically with participants simply providing unstructured or partially structured commentary alongside those system-generated log events and messages. For example, if an embodiment of the invention is integrated with an existing personal diabetes manager (PDM) tool that makes recorded data available via an API, it shows all those messages, or optionally a subset, from the PDM along with the commentary of the group of individuals or entities interested in the patient.

Messages may be entered by participants either directly in the user-interface of the system or as a response to device notifications/alerts provided outside of the application itself. For example, a stock low alert results in a phone-system-level notification that provides a button to initiate a buy on that stock without ever needing to open the standalone application. Embodiments of the invention may use standard push notifications, SMS notifications, or silent push notifications where a visible system alert is dynamically created client side asynchronously or synchronously upon receiving the silent push notification content.

In embodiments of the invention the alert is recognized/received, the system generates the notification, and provides the button when the alert is received. For example, embodiments of the invention use the setBackgroundMessageHandler( ) capability of a mobile application platform to register a function to run when a silent push message is received. That message may contain the details of an alert in the form of a JSON object and the handling function turns that into a standard mobile device notification to be delivered to the end user even when the application is not running in the foreground.

Structured messages and/or log entries may be suggested by the system and made enterable via a single click on a button or user interface element either inside the application or in a system-level alert or notification. A button or user-interface element may also take the user to a partially completed structured data form for them to complete their message and/or log entry. For example, upon detecting vigorous physical activity via a connected watch, a phone-system-level notification provides a suggestion to enter an exercise log entry corresponding to the type of activity associated with the GPS location identified by the phone, e.g. swimming when at a community pool.

By implementing the above-listed steps a person would enable themselves and optionally others to record structured log messages alongside contextually relevant automatically annotated metrics while they are interacting with a messaging system.

Embodiments of the invention can be deployed either as a standalone messaging/chat application that integrates the steps described herein and runs on desktops, laptops, browsers, televisions, smart speakers, mobile phones, tablets, watches, or other electronic devices. Alternatively, embodiments of the invention can be deployed as a chatbot that is integrated into any form of electronic device or messaging application via an application programming interface (API) and embed the steps described herein to respond to messages/chats on that platform.

The invention can be used in any number of fields as mentioned earlier.

Alerting Systems

Embodiments of the invention leverage sensor data, e.g. GPS and other radio devices and other sensors, and optionally configured rules about responsible parties to assign alerts automatically to a subset of the parties eligible to address the alert. Embodiments of the invention use manual and automatic feedback about the corrective action or lack thereof to subsequently reassign and escalate alerts to other parties until the alertable condition is resolved.

Other approaches either restrict their alerts to a single device that directly observes the error condition, or instead broadcast the alert to all known devices in an undirected fashion.

The existing systems either:
a) Alert a single person thus lose ability to engage multiple possible caregivers, i.e. they under-alert; or
b) Over-alert and provide an annoying disruption to multiple possible caregivers simultaneously.

Embodiments of the invention alert one or more devices immediately based on which caregivers are predicted via sensors and automatic and manual configurations as most likely to be able to meaningfully and quickly correct the alertable condition. It also leverages feedback about the correction of the alertable condition to terminate alerts on other devices or feedback about the non-correction of the alertable condition to re-assign and escalate an alert to other devices and caregivers for them to have a follow-up chance to correct the alertable condition.

Embodiments of the invention create alerting aggregation intermediaries, either in device or in software form, that serve to collect all the alerts from one or more systems and then dispatch those alerts, thus adapting one or more dumb alerting systems to become either a unified or separate smart alerting system. For example, an integration may involve registering alerts from an insulin pump to report when the pump is out of insulin. Instead of just broadcasting that dumb alert to all the users, embodiments of the invention apply its default and configured and learned rules to escalate the alert appropriately in a timely fashion so that only one user's attention is interrupted at a time as with the other smart alerts provided by embodiments of the invention.

FIG. 8 shows candidate alerting conditions according to the invention. In FIG. 8, the following steps are shown:
1. Identify the alertable condition requiring attention. For purpose of the discussion herein, and without loss of generality, take a single alertable condition "A."
2. Identify the devices and users able to be alerted, e.g. User 1 has two devices (U1: D112, D12), user 2 has three devices (U2: D21, D22, D23), and User 3 has two devices (U3: D31, D32). In this example, available users are as follows: User 1's second device is off (U1: D11), User 2's GPS says that she is out of state (D21, D22, D23), and User 3's calendar is free and both devices were used recently (D3: D31, D32).
3. Filter based on those devices' and users' availability, e.g. {U1's D11, U3's D31, U3's D32).
4. Sort the filtered list into a partially ordered sequence of devices and users to alert. For example, U3 is closer to the problem and has used D31 more recently than D32. A partially ordered list of user devices in this example is U3's D31→U1's D11→U3's D32, although multiple devices could be equal in order.
5. Show the alert to the one or more devices or users at the top of the list, for example alert U3's D31, or alert multiple devices.
6. Wait for those devices or users to respond either by correcting the condition (go to step 7) or by explicitly passing on the opportunity to react or because of a timeout without correction by the alerted user.
6b. After all the users or devices that were alert have either explicitly passed or an automatically or manually configured time limit has passed, move the current group of devices or users who got the alert to the bottom of the list and go back to step #5 to send the alertable condition to the subsequent group of users or devices. For example, U3's D31 is moved to the end of the list if there is no response or a timeout and the next in list is alerted, i.e. U1's D11.
7. If a device or user corrected the action, cancel the alertable condition for all users and remove the alert display from all the users or devices.

The devices coordinate all their actions either by peer-to-peer communication or via a centralized broker service. The centralized broker system can be built using any number of techniques including, but not limited to, Web service technologies and APIs.

By following the above listed steps, embodiments of the invention facilitate the correction of the alertable condition without requiring extra actions from uninvolved devices or users.

One or more alertable conditions are required; the need for a correction of that condition is not explicitly required. For example, the only requirement may be an acknowledgement from one or more devices or users that the condition exists. In a valuable form of the invention, an explicit corrective action is taken by exactly one device or user resulting in the dismissal of the alertable condition on all devices and for all users.

Various sensors are used to provide the ordering of devices and users as to who receives the displayed alerts first. Among the possible sensors are GPS location sensors to order by proximity to the alertable condition, wireless networking information indicating coarse-grained proximity to the alertable condition, e.g. the Wi-Fi MAC address of the various candidates devices of their dominant users or Bluetooth/BLE radio broadcasting, motion/exercise/fitness/gyroscope sensors which speak to the different devices' or users' availability to address the alertable condition, e.g. if one person is swimming they may not be the best person to administer an insulin injection to a child in the household at that moment, calendars of various users or devices indicating availability and busy-ness of different devices or users, recent photos taken on a device or other activities on that device or other known devices managed by a given user indicating their current attention, e.g. if editing in a word processor document on a laptop that might indicate a less desirable candidate to trouble with correcting an alertable condition, and many more.

Display of the alerts may take many forms include device-level or application-level notifications or badges, sound or vibration effects, passive display in application, chatbot messages or SMS messages or notifications, home speaker announcements, smart speaker or smart display announcements, automated phone calls, or other mechanisms, such as light, including lighting up a nightstand hub or alarm clock, a docked phone, etc., and using phone calls from distinguished numbers so that the caller ID is sufficient to identify the alert condition.

Every ordering of steps is reasonable. For urgent alertable conditions one best practice may include alerting all users and devices simultaneously because the threat of a missed alert is far greater than the downsides in disrupting multiple users or devices simultaneously.

Manual rules are allowed, for example, at nighttime when many of the other sensors and input data for prioritizing the alerts might not be differentiating among all the devices or users. As a further non-restrictive example, a husband and wife whose phones are in the same room would be hard to order sequentially for addressing an alertable condition related to a problem with the house or a health issue in a child, so they might choose alternate nights to be on-call to be first in the sequence of notification of the alertable condition.

The detection of alertable conditions is application-specific and includes such things as out-of-range measurements from a continuous glucose monitor or other health-related devices, such as blood pressure or blood oxygen monitors, or others. The alertable condition may also be based on a prediction of future values based on past values of one or more sensors and other data, e.g. a simulation of the expected blood glucose levels over the next minutes or hours, or other applications.

Manual or automatically discovered rules may be applied to select the order of alerted devices and/or users. For example, two parents might configure alternate-night on-call schedules so their phone is the first to alert for a condition elsewhere in the house every-other-night, and such a rule may be inferred by the adult that addresses the alertable condition based on day of week or other temporal or other signals.

Embodiments of the invention can be used for alerting devices that operate autonomously or partially autonomously or can be used for alerting users via one or more devices that they may commonly use or have recently used, including but not limited to shared devices. It can be used for automations surrounding health care issues, house or automobile care issues, security issues, both physical and digital, problems requiring attendance to a software or hardware problem on a computer, a set of computers, a datacenter or a set of datacenters.

Embodiments of the invention create alerting aggregation intermediaries, either in device or in software form, that collect all the alerts from one or more systems and then dispatch those alerts, thus adapting one or more dumb alerting systems to become either a unified or separate smart alerting system.

In embodiments of the invention, sensor data can comprise any of a blood pressure reading, blood glucose reading, electrical activity, whether any of said reading is in range, how a query rate compares to historical averages, systems related readings including any of CPU load and memory usage and moving averages of stock prices.

In embodiments of the invention, predictive values comprise predictions of a sensed value using a state derived from logged information inferred or specified via one or more communications.

Embodiments of the invention automatically understand any of messages, images, video, and voice in messaging interactions Embodiments of the invention turn more structured explicit log entries into natural communications.

Embodiments of the invention suggest changes to logged messages based on a probability that observed data to date is derived from historically recorded facts.

In embodiments of the invention an alert can comprise any of a notification on a smart device, a sound, a light blinking, and integrations with home automations or other devices.

In embodiments of the invention financial instruments comprise any of instruments related to stock, commodities, bonds, and options.

In embodiments of the invention, systems can comprise any of computer systems, production computing services, nuclear reactors, production lines, and power plants.

In embodiments of the invention system metrics can comprise any of incoming query rate and CPU load readings.

Embodiments of the invention limit an alert to a narrow set of devices/users; and when said devices/users do not respond, escalate the alert to a next user/device, and repeat until no additional users are available to interact.

In embodiments of the invention, for an urgent condition, everyone is alerted simultaneously.

In embodiments of the invention, when a user receives an alert, the user can either dismiss the alert for the user only, for everyone who received the alert or, the user can log a corrective action, wherein logging the corrective action terminates the alert, stops escalation of the alert, and eliminates the alert from devices of everyone who received the alert.

In embodiments of the invention, after determining when a recipient of the alert is in a state where the alert is less disruptive, the alert is generated to call attention to situations that require less urgent intervention or interaction; and for a more urgent situation, the alert is generated to call attention to situations that require immediate intervention or interaction.

In embodiments of the invention, sleep monitoring is used to determine the state where the alert is less disruptive.

In embodiments of the invention, for a more urgent situation, the alert is generated to call attention to situations that require immediate intervention or interaction by delivering the alert to a recipient via a phone call having a user ID that circumvents a do not disturb phone setting.

In embodiments of the invention, an alert is generated to call attention to situations that require intervention or interaction by leveraging confidence intervals rather than a single point estimate time prediction, wherein the alert is based on a confidence interval of probabilistic alerting outcome instead of a maximum likelihood estimate exceeding a threshold.

Implementation

Figure 9:
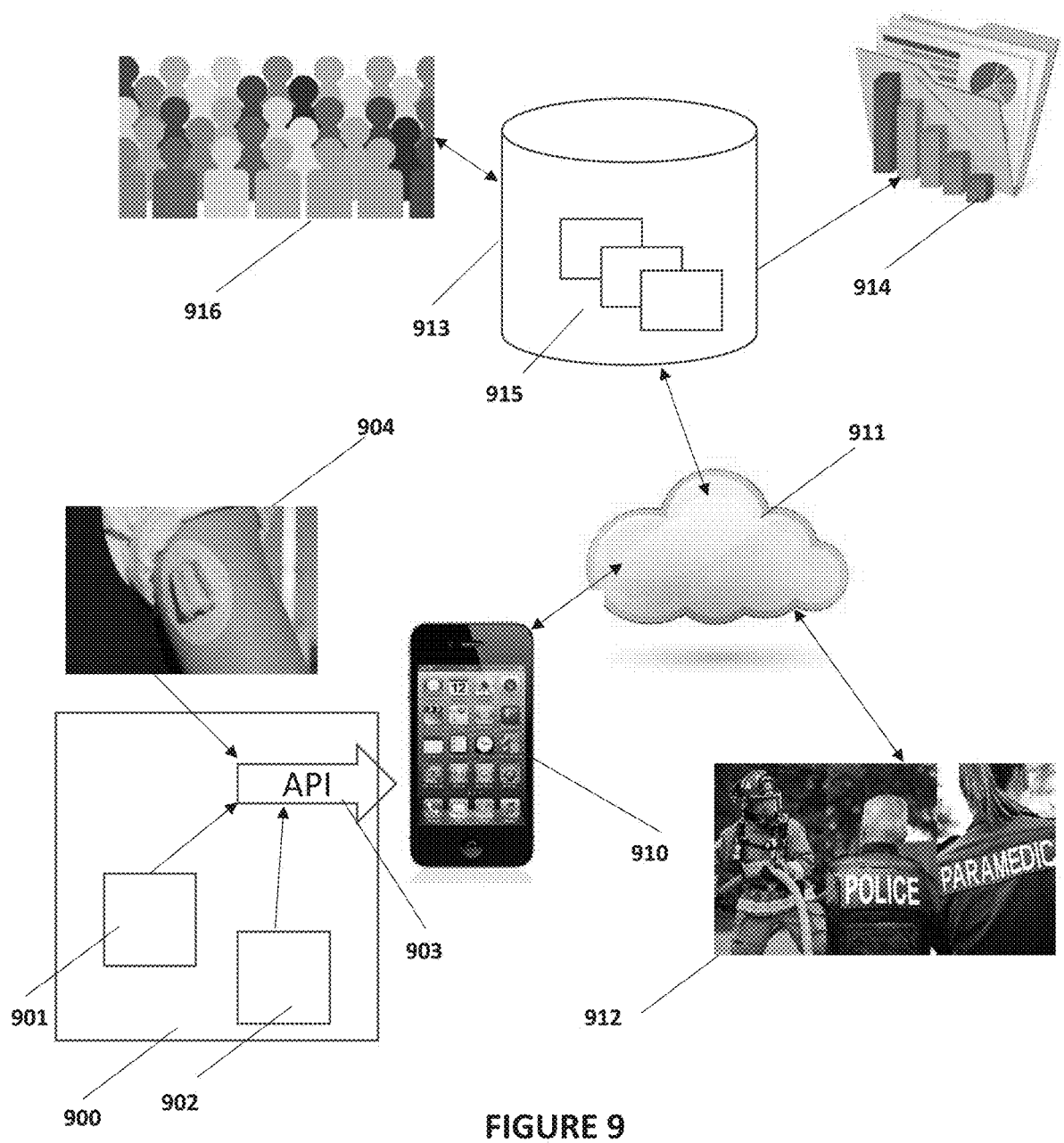
FIG. 9 shows an implementation of a message-based logging and alerting system according to one or more embodiments of the invention.

FIG. 9 shows an implementation of a message-based logging and alerting system according to one or more embodiments of the invention. In FIG. 9, a user device 910, such as a smartphone or other device includes an app 900 that automatically collects data from various sources and/or sensors as part of a messaging system. Sensors can include, for example a PDM 904 in the case of a medical application, although embodiments of the invention can query various data sources, e.g. in the case of a finance related applications.

The app includes various modules, such as a user interface module 901 for creating log entries, rules and other modules 902 for monitoring, formatting, and appending data collected from various data sources and/or sensors to messages, and an interface to the smart device, i.e. API 903. The smart device can store all data locally, and automatically communicate with a logging service 913 via a network 911 such as the Internet.

The logging service receives messages from the smart device that include text and sensor/data source related information and uses various modules 915 to collate, analyze, process, or otherwise manipulate the message-based information. For example, the information may be assembled into a form of report 914 showing, e.g. a person's blood glucose profile over time. The logging service may analyze such data and, if certain conditions are detected, it may automatically trigger an alert for assistance from qualified responders 912. The logging service also coordinates messages exchanged between multiple users 916. These and other applications of the logging service are discussed above.

Figure 10:
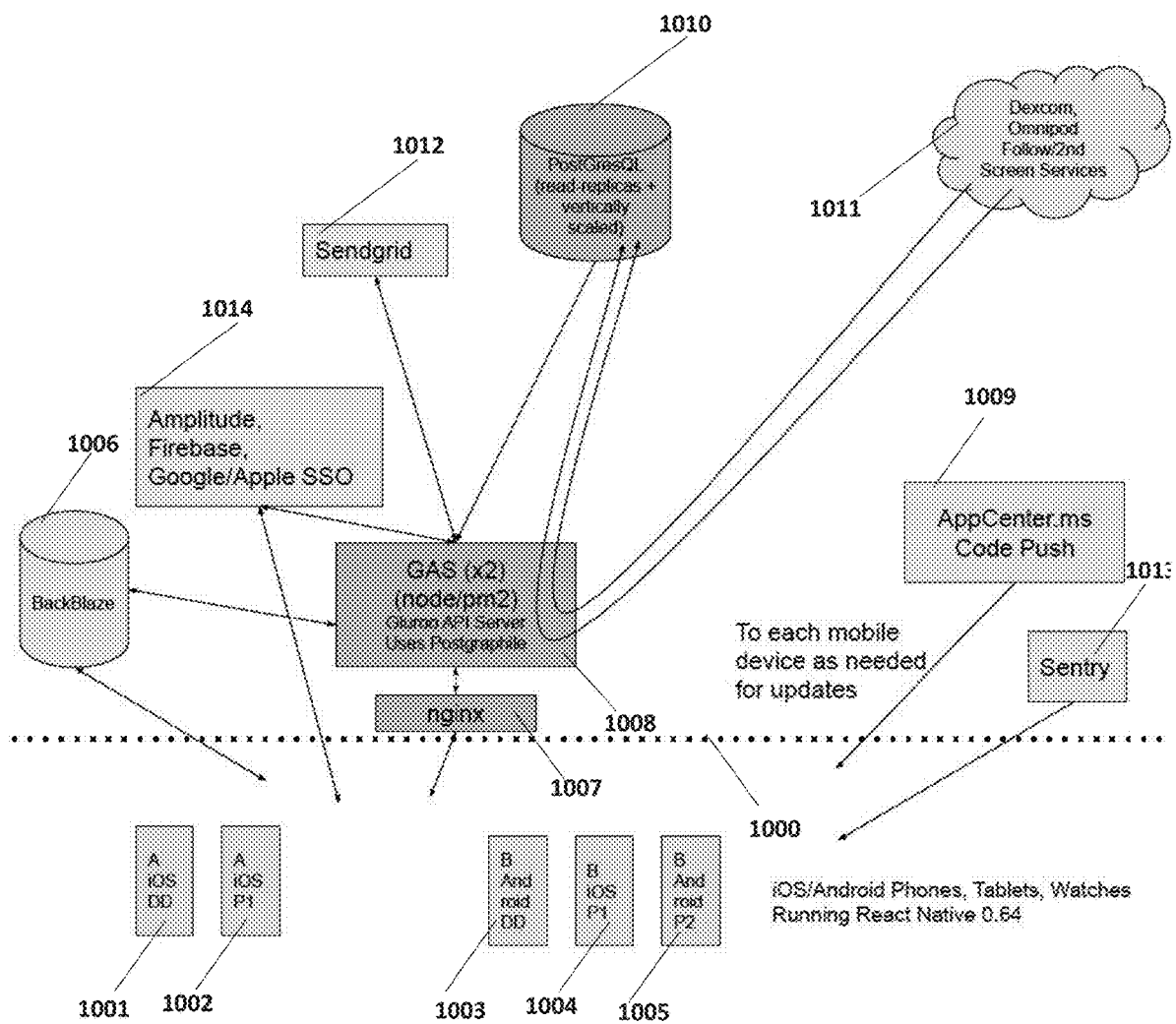
FIG. 10 shows a system architecture group according to one or more embodiments of the invention.

FIG. 10 shows a system architecture group according to one or more embodiments of the invention. In FIG. 10, an example of a multi-tiered architecture embodying the invention supports images, notifications, on-demand updating, and synchronization across multiple users and multiple devices using a centralized server and database.

In this example architecture, the end user mobile devices are illustrated at the bottom of the page below the dashed line 1000. Above the dashed line are numerous cloud (server-side) components that the mobile devices communicate with via internetworking protocols and that communicate with each other via internetworking protocols. Mobile devices 1001-1005 connect directly to a service, as they do when communicating with the Backblaze cloud datastore 1006 to upload and download images taken on the mobile device. Mobile devices also may connect to a server via a reverse proxy such as nginx 1007 which provides additional security to the Gluroo API Server (GAS) 1008. Server-side components may be managed by a third-party, as is the case with BackBlaze, Sendgrid 1012, AppCenter 1009, etc., or by the operating entity, as is the case with GAS and the PostGresQL database 1010.

The GAS responds to GraphQL requests from the mobile devices and processes them by communicating with the SQL database storage tier represented by PostGresQL in FIG. 10. The GAS also has various intermittent time-based fetching functionality where it communicates with 3rd-party APIs provided by Dexcom 1011 for Continuous Glucose Monitor data fetching and by Insulet's Omnipod for fetching data entered their Personal Diabetes Manager [PDM] devices. Those data are collected by the GAS via internetworking protocols and stored in the PostGresQL database where they are available for later GraphQL fetches by the mobile devices. AppCenter.ms Code Push is used to provide updates of the JavaScript code running on the end user mobile devices, and Sentry 1013 and Amplitude 1014 are used to provide monitoring, instrumentation, and crash analytics.

User Interface

Figure 11:
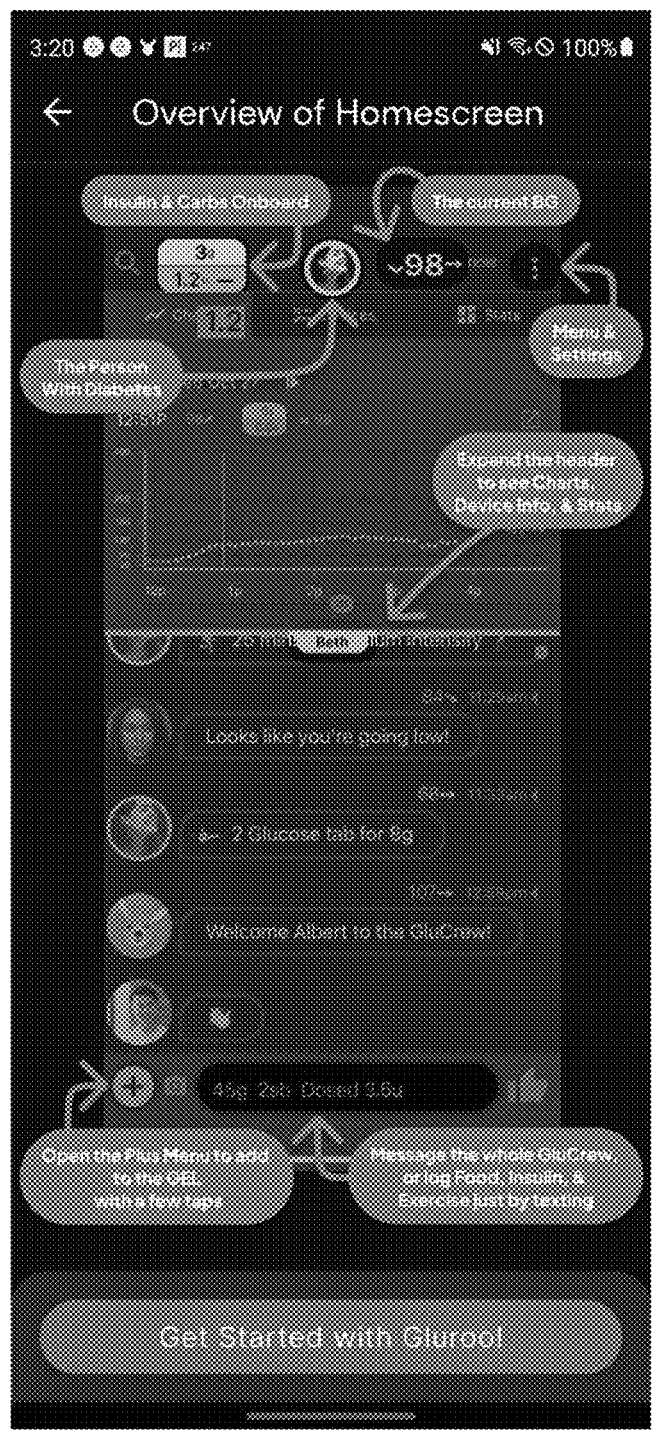
FIG. 11 shows a summary of a screen layout group according to one or more embodiments of the invention.

FIG. 11 shows a summary of a screen layout group according to one or more embodiments of the invention. In FIG. 11, an example of a layout of a system embodying this invention in the context of diabetes or other health conditions shows a BG sensor value in the top right and being copied as a header on each log item. Tracking of the entered log information including understanding of how insulin and carbs decay over time is shown in the top left ("Insulin & Carbs Onboard").

Figure 12:
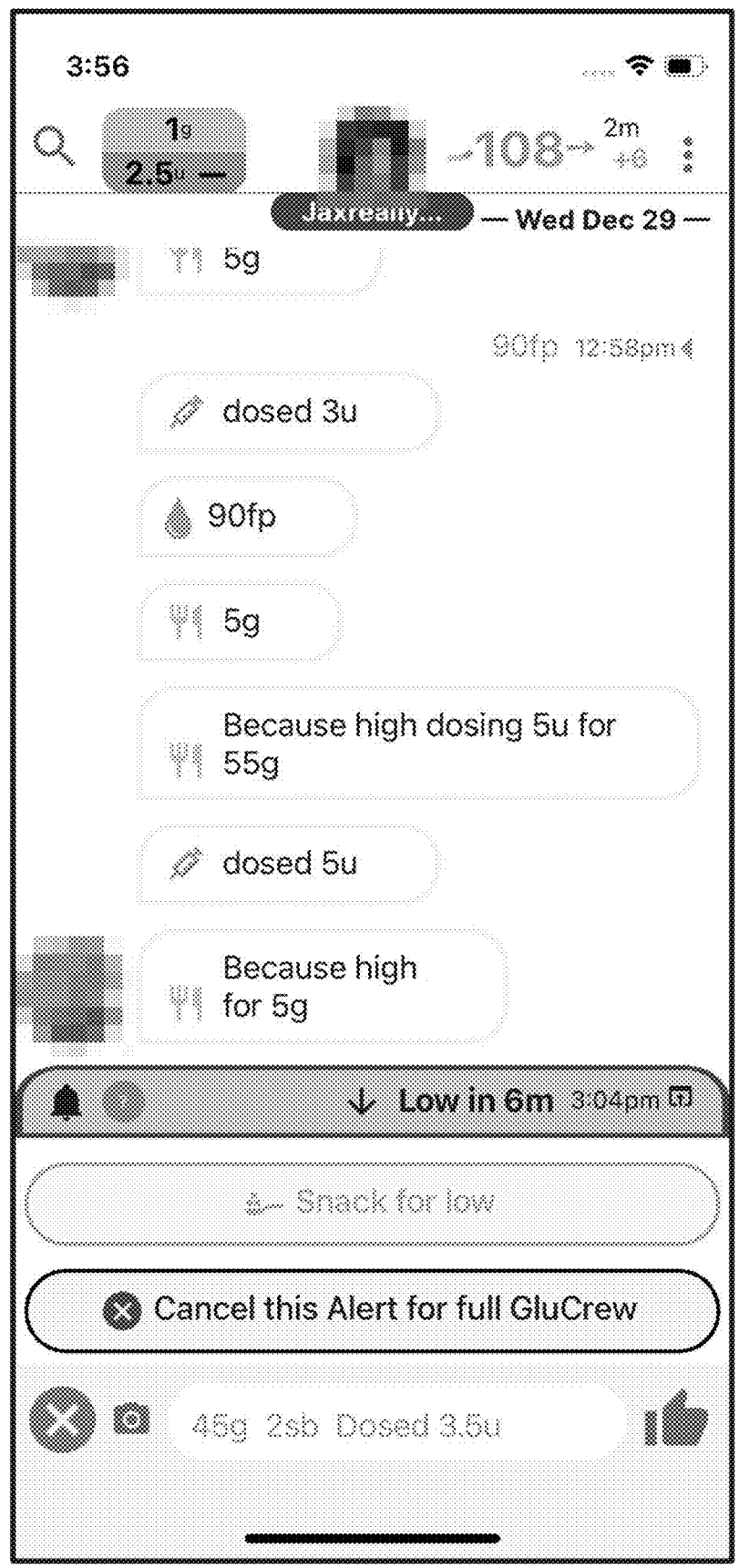
FIG. 12 shows alert response options according to one or more embodiments of the invention.

FIG. 12 shows alert response options according to one or more embodiments of the invention. In FIG. 12, an example of a set of options presented when tapping a displayed alert is shown.

Figure 13:
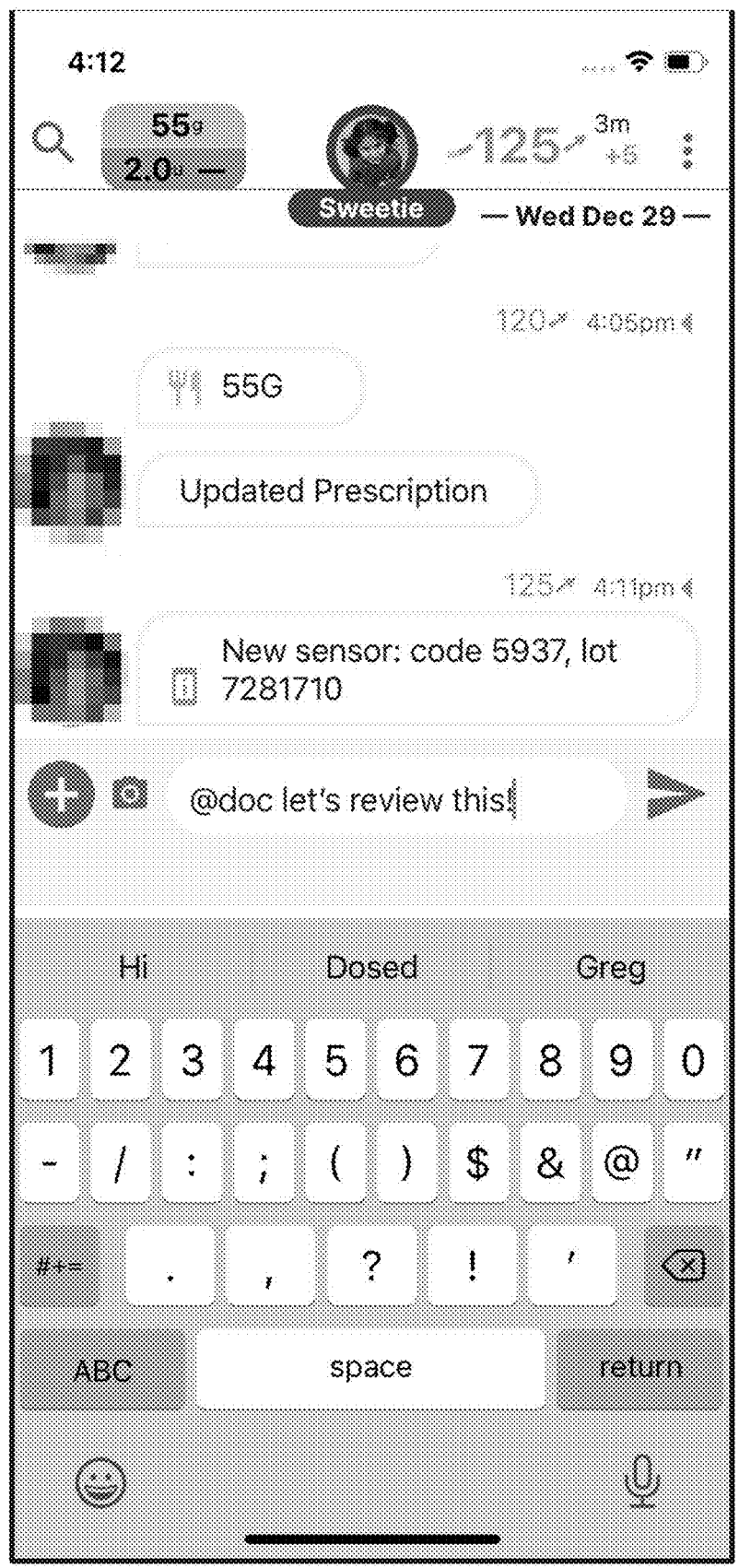
FIG. 13 shows referencing a doctor to loop into communications according to one or more embodiments of the invention.

FIG. 13 shows referencing a doctor to loop into communications according to one or more embodiments of the invention. In FIG. 13, an embodiment of the invention supports referencing members of the group using the conventional @name notation but extends it with a novel invention of a lightweight integration of a non-ordinary group member such as the patient's doctor where the @ reference sends an email to a pre-provisioned email address.

Figure 14:
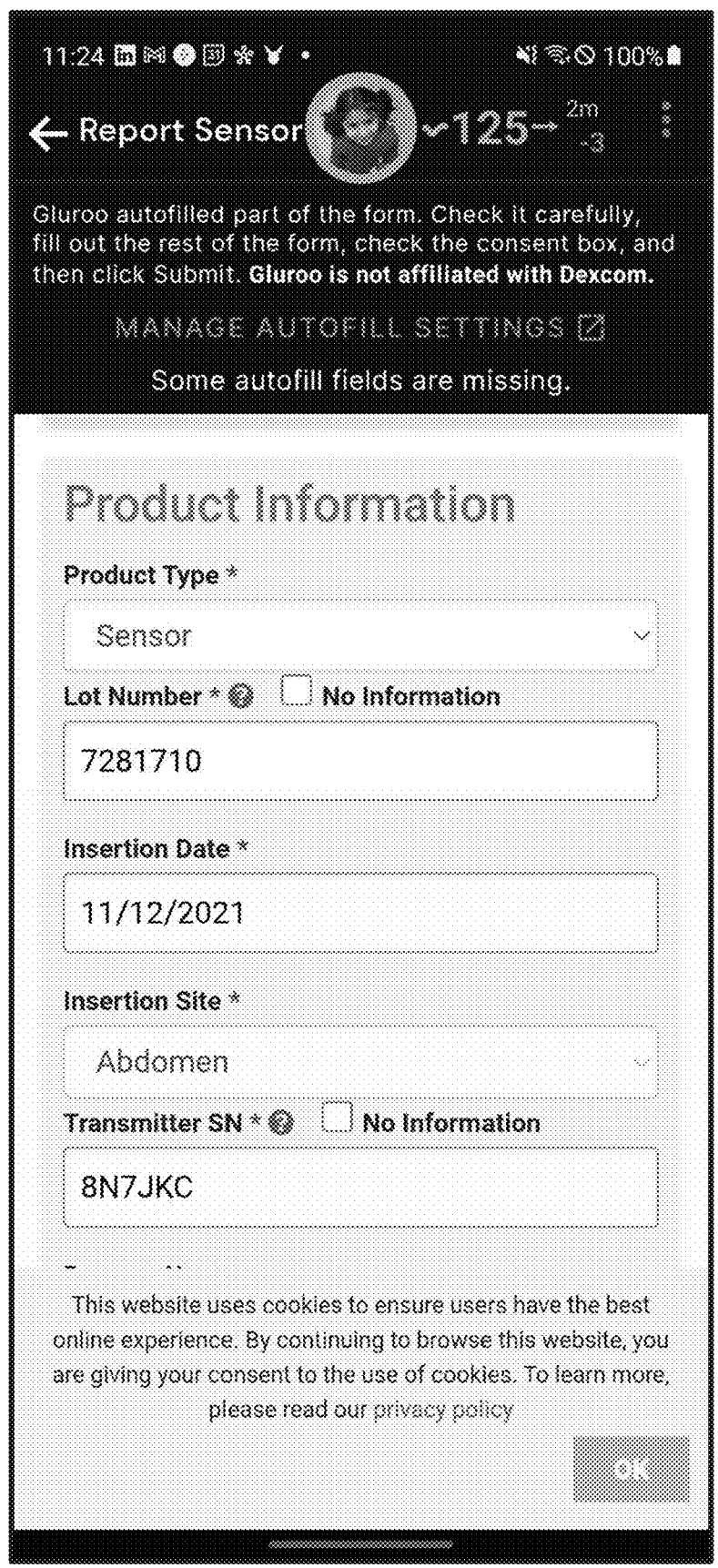
FIG. 14 shows autofill reporting of a failed sensor according to one or more embodiments of the invention.

FIG. 14 shows autofill reporting of a failed sensor according to one or more embodiments of the invention. In FIG. 14, an example is shown of automatically filling in a problem report form for a continuous glucose meter device that has failed prematurely using data entered and tracked independently and only once into the system to make the process fast and foolproof.

Figure 15:
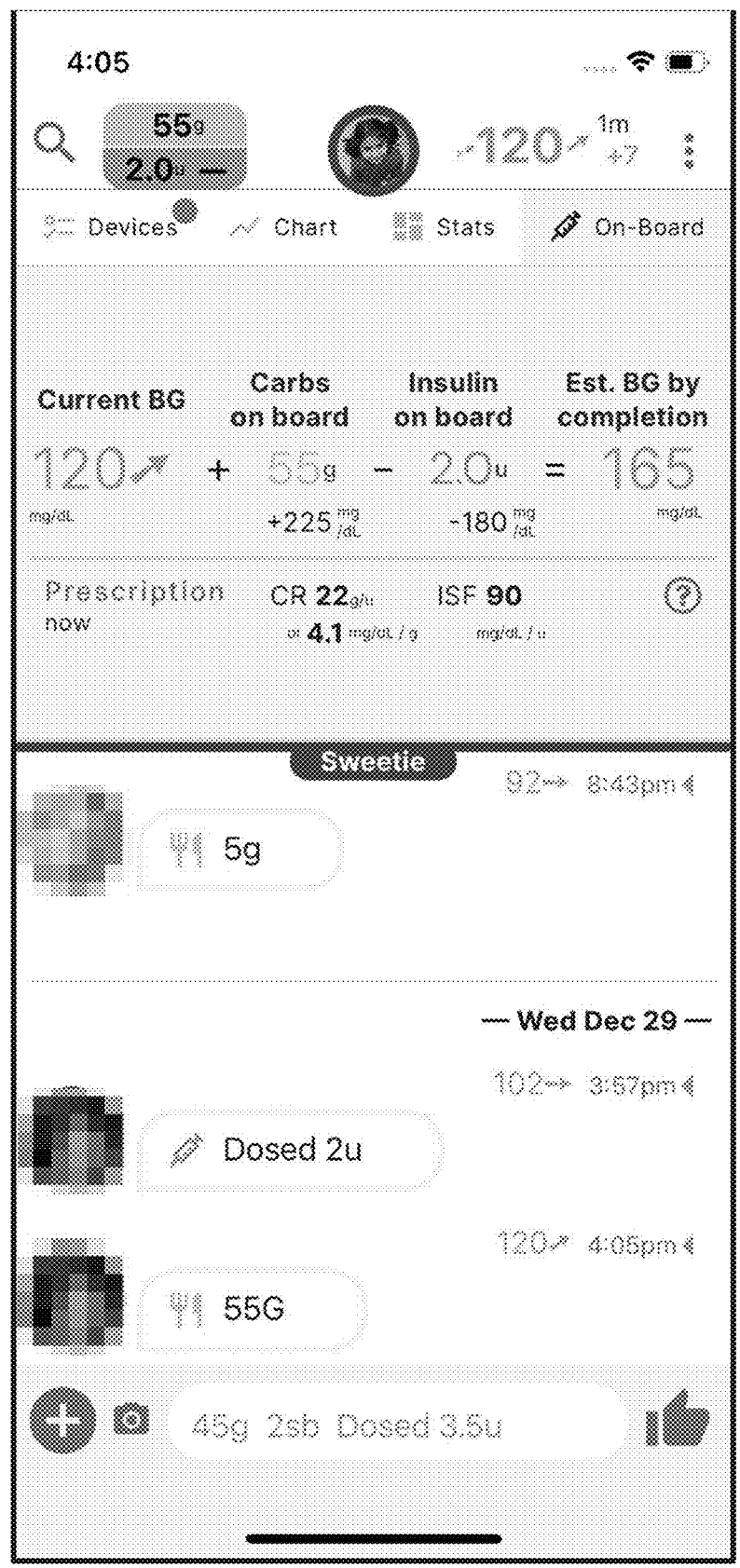
FIG. 15 shows calculation of derived values from aggregates according to one or more embodiments of the invention.

FIG. 15 shows calculation of derived values from aggregates according to one or more embodiments of the invention. In FIG. 15, an example is shown of a calculation of a derived value using the system's understanding of the values entered and of the modeled underlying system, in this case, of the interaction of carbohydrates and insulin in a person with diabetes.

Figure 16:
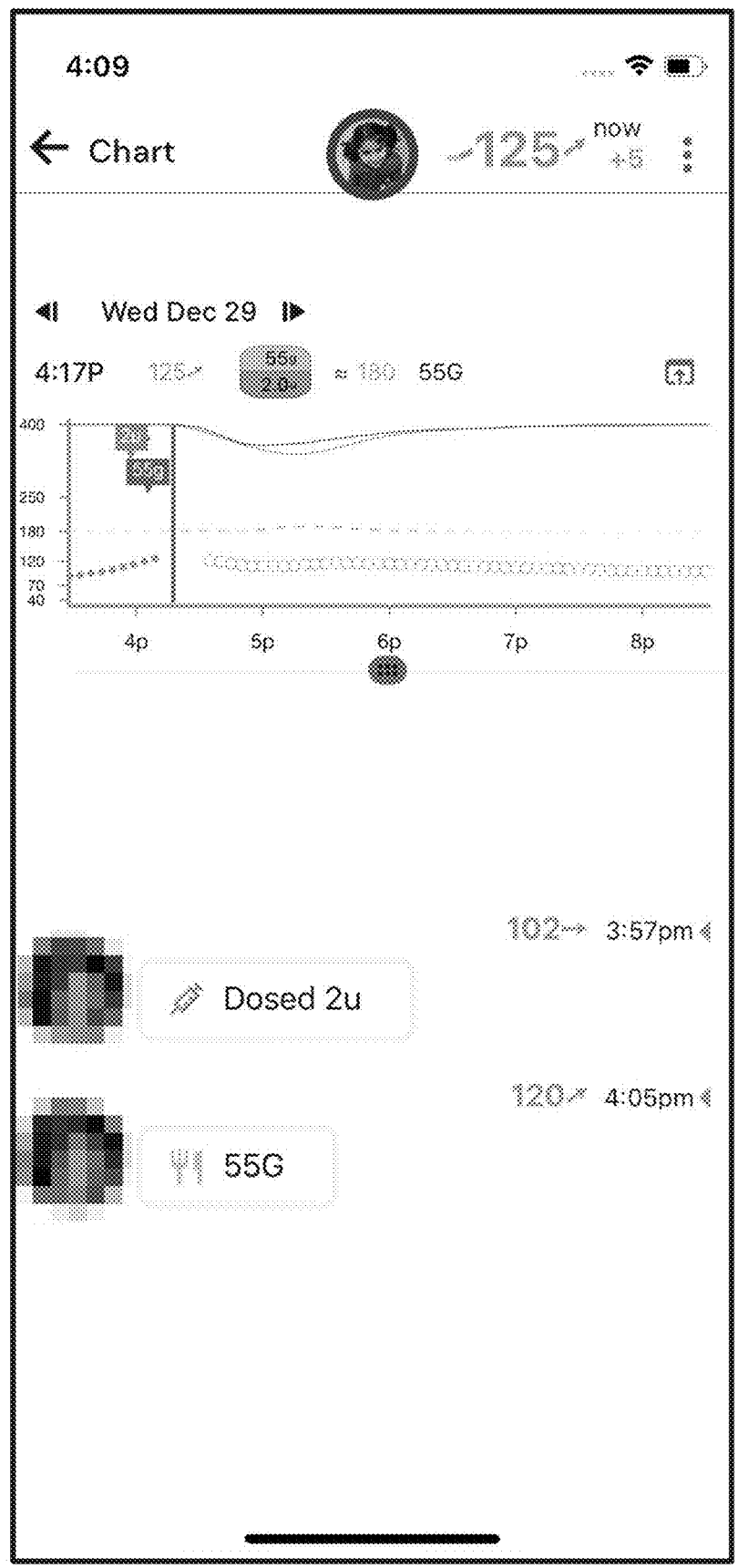
FIG. 16 is a chart showing corresponding messages according to one or more embodiments of the invention.

FIG. 16 is a chart showing corresponding messages according to one or more embodiments of the invention. In FIG. 16, an of a chart shows the corresponding messages. As one scrolls through the chart in the graphical representation, the messages displayed underneath are updated dynamically, while only summaries of the messages are shown in the graphical chart, e.g., "2 u" and "55 g."

Figure 17:
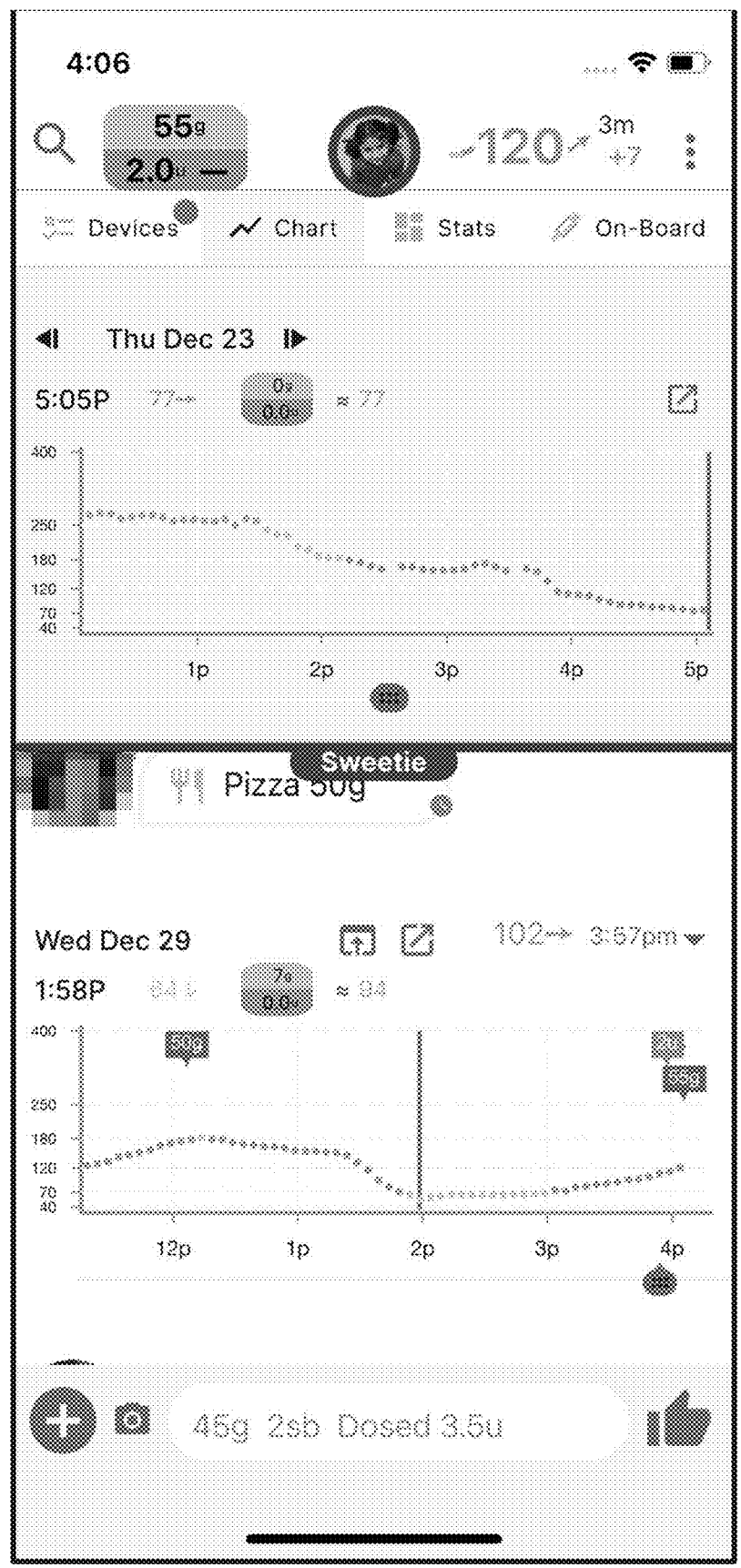
FIG. 17 is a comparison of drop-down and in-line charts according to one or more embodiments of the invention.

FIG. 17 is a comparison of drop-down and in-line charts according to one or more embodiments of the invention. In FIG. 17, an example showing how two separately scrollable charts can be viewed onscreen simultaneously using the drop-down tray's chart tab alongside a log items inline chart that displays directly in the messaging log when it is expanded.

Figure 18:
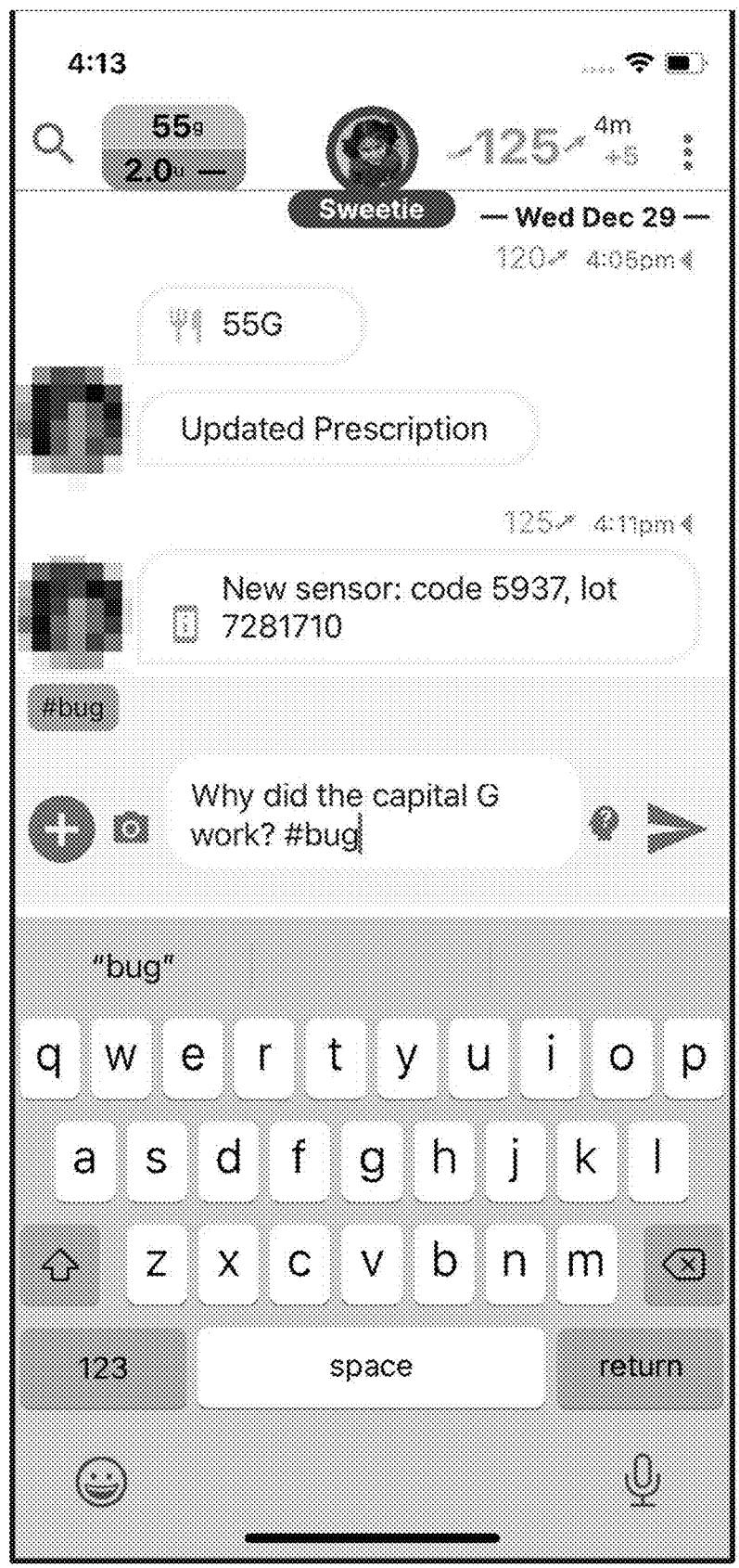
FIG. 18 shows a hash bug for reporting bugs according to one or more embodiments of the invention.

FIG. 18 shows a hash bug for reporting bugs according to one or more embodiments of the invention. In FIG. 18, a message tagged with #bug represents a bug report and automatically shows in the administrative dashboard with the corresponding information of the reporting user and the related context, thus making reporting and responding to bug reports easier.

Figure 19:
FIG. 19 shows image recognition tied to a product according to one or more embodiments of the invention.

FIG. 19 shows image recognition tied to a product according to one or more embodiments of the invention. In FIG. 19, an example of an image recognition of a product label is shown tied to a nutrition database to simplify logging meal/food related information.

Figure 20:
FIG. 20 shows image recognition tied to a UPC according to one or more embodiments of the invention.

FIG. 20 shows image recognition tied to a UPC according to one or more embodiments of the invention. In FIG. 20, an example of image recognition via a UPC label is shown tied to a nutrition database to simplify logging meal/food related information.

Figure 21:
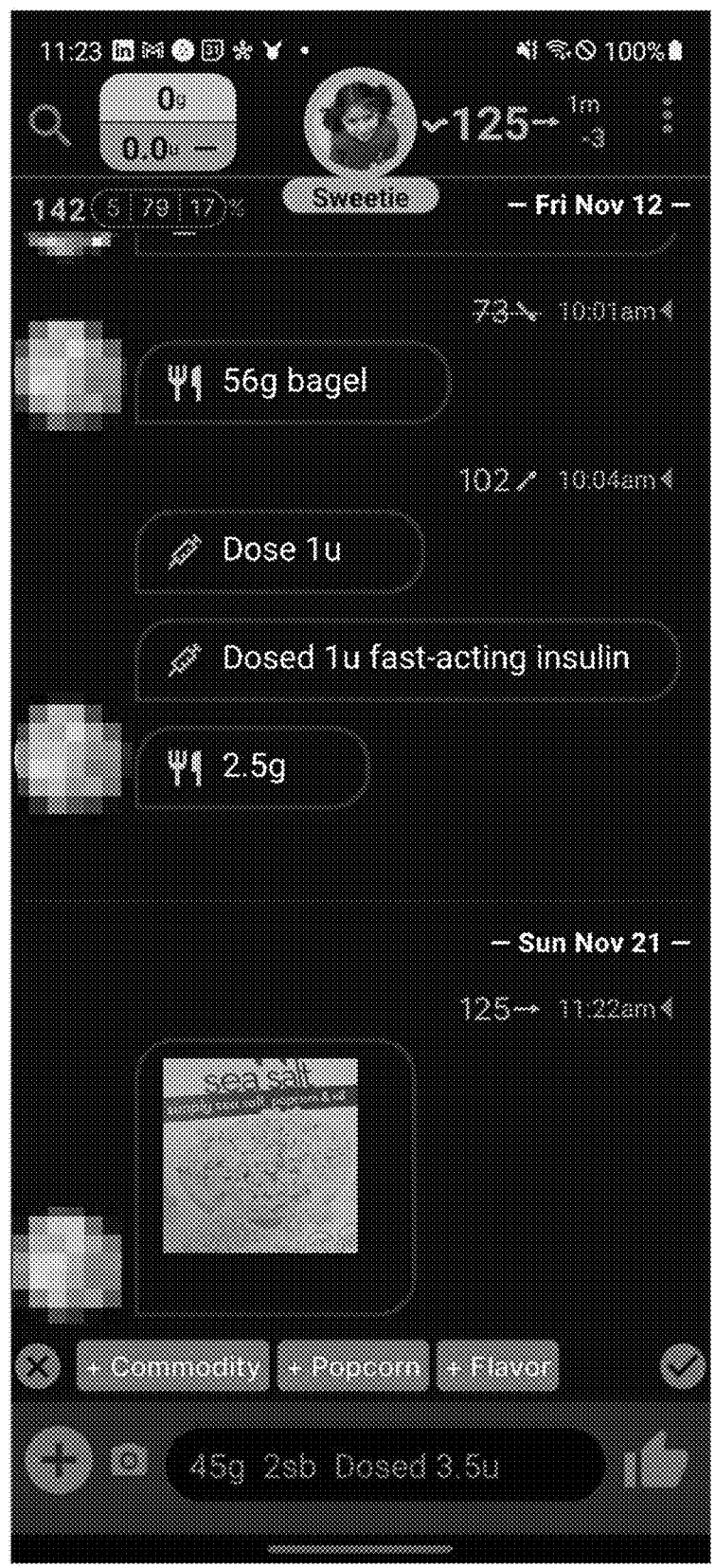
FIG. 21 shows a labelling interface for photos according to one or more embodiments of the invention.

FIG. 21 shows a labelling interface for photos according to one or more embodiments of the invention. In FIG. 21, an example s shown of manual labeling of a photo being added to the log after an image understanding algorithm has processed the photo.

Figure 22:
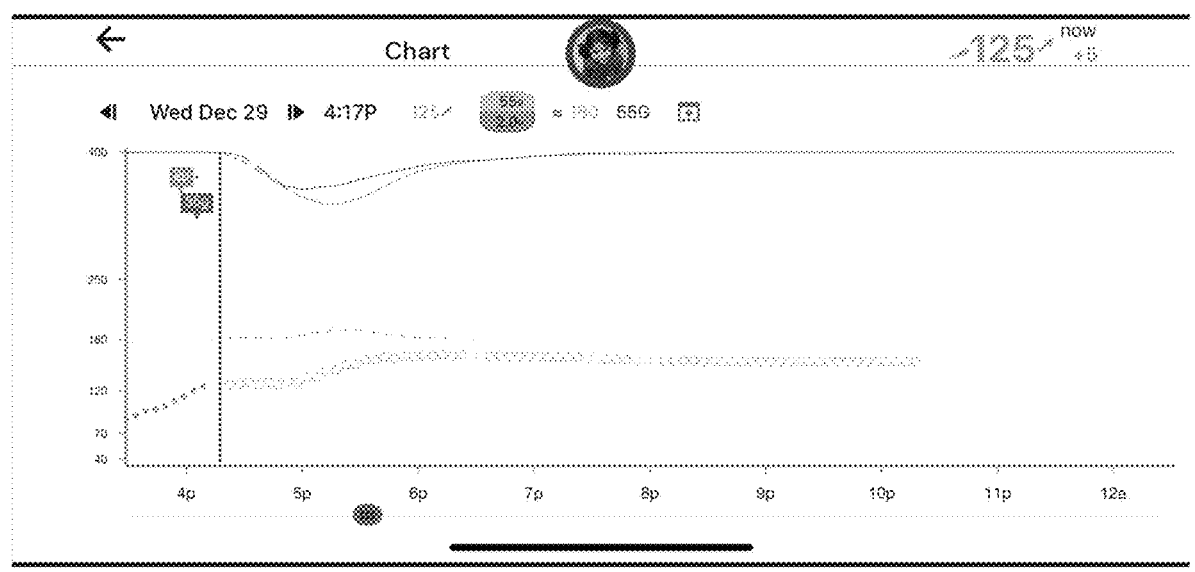
FIG. 22 is a landscape chart showing activations and prediction all on single chart according to one or more embodiments of the invention.

FIG. 22 is a landscape chart showing activations and prediction all on single chart according to one or more embodiments of the invention. In FIG. 22, an example chart showing historical blood glucose values (closed circles), logged insulin ("2 u" marker) and food ("55 g" marker), activation estimations for insulin (first from the left solid line coming down from the top) and carbohydrates (second from the left solid line coming down from the top), estimated rise/fall of blood-glucose levels (dash line in center), and predicted absolute blood glucose levels (open circle outlines).

Figure 23:
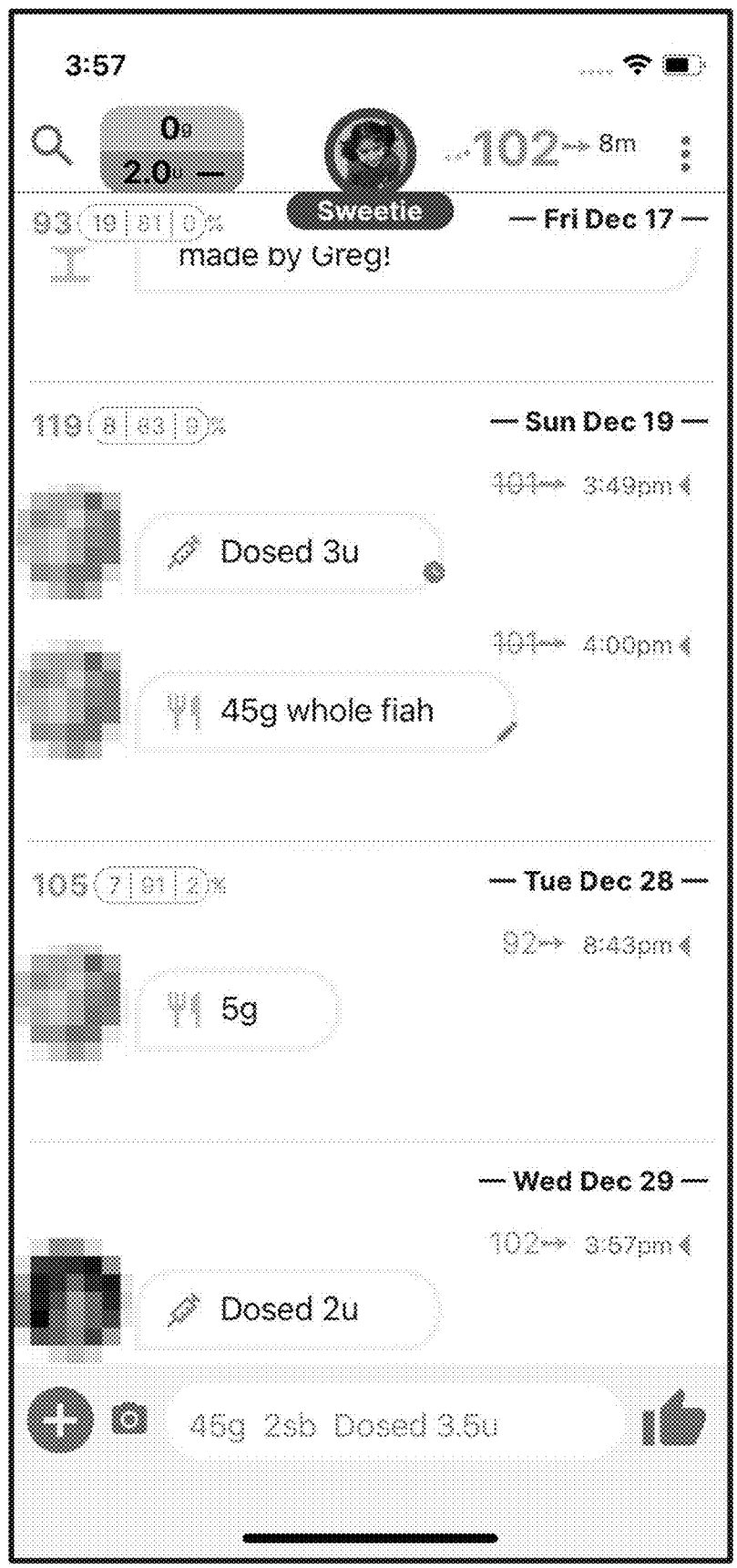
FIG. 23 shows log tracking metrics according to one or more embodiments of the invention.

FIG. 23 shows log tracking metrics according to one or more embodiments of the invention. In FIG. 23, an illustration is provided of multiple days of logging where each day's header shows summary statistics for that day, e.g. at the very top for Dec 17, 93 is the average blood glucose level, and the readings were below range for 19% of the day, in range for 81% of the day, and above range for 0% of that day.

Figure 24:
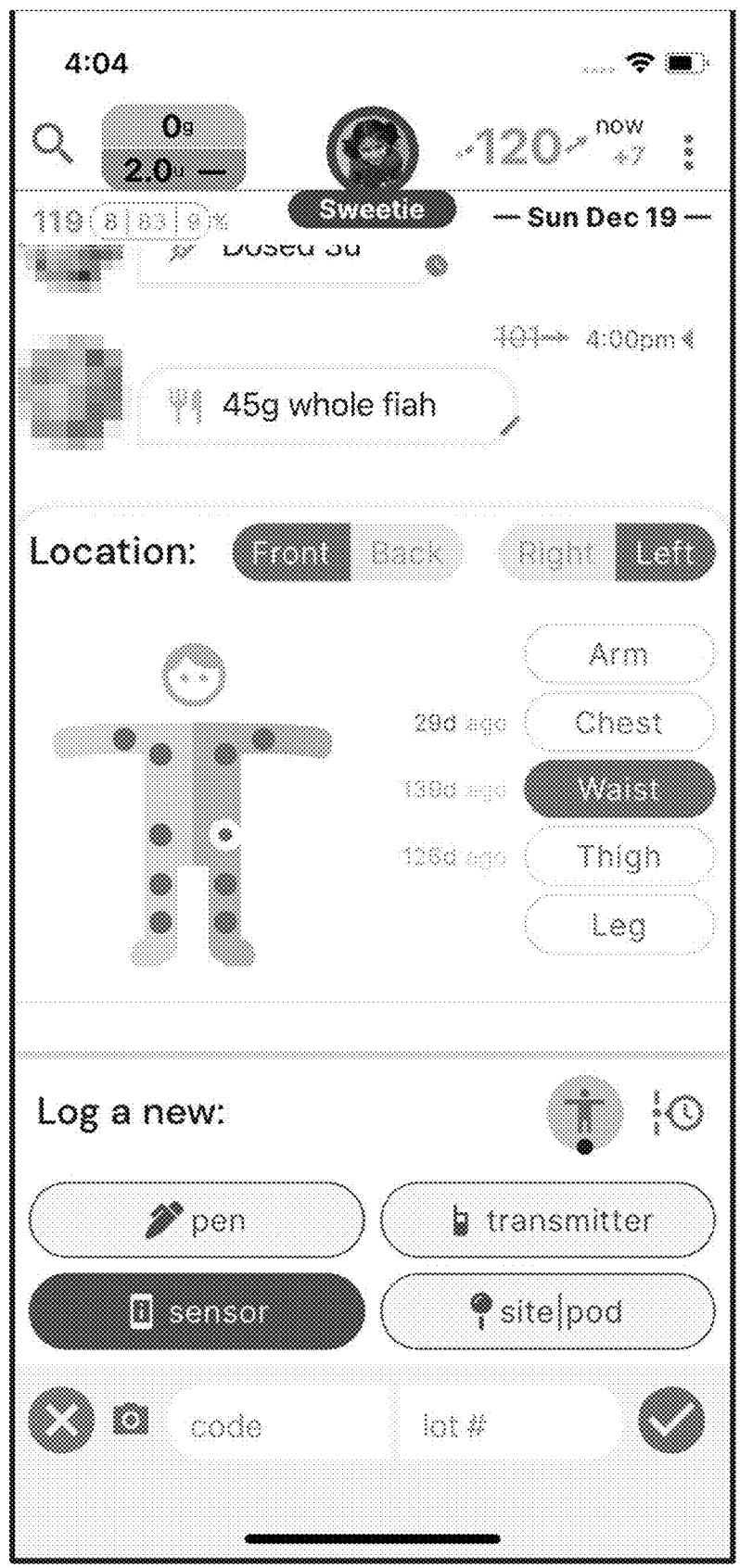
FIG. 24 shows logging body location with a new device according to one or more embodiments of the invention.

FIG. 24 shows logging body location with a new device according to one or more embodiments of the invention. In FIG. 24, an example is shown of graphically recording the location of a new sensor being logged. This can also be done directly by naming the body part in a text message. The graphical view shows how long ago each location was used to facilitate rotation of locations.

Figure 25:
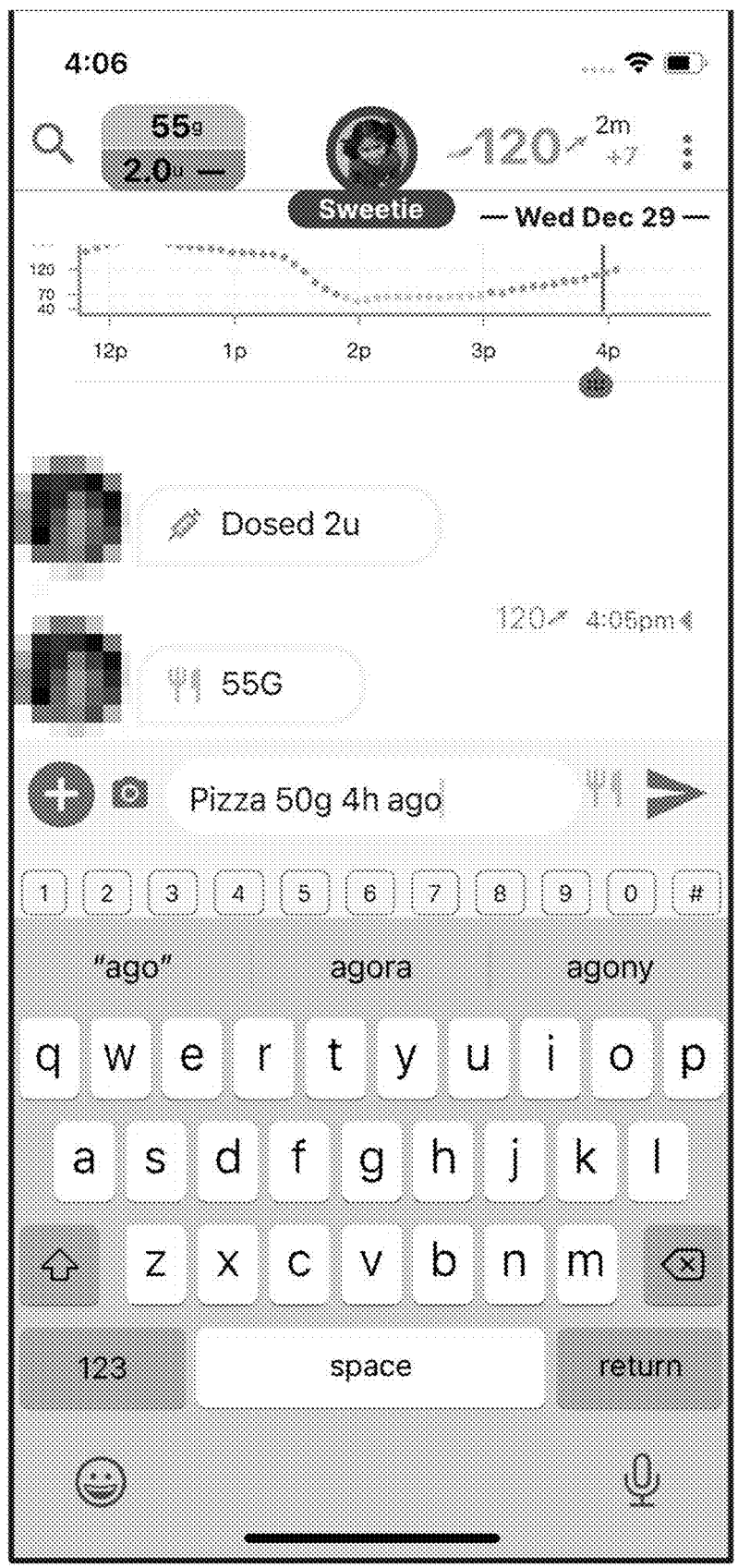
FIG. 25 shows NLP entering of a time of a log entry shorthand according to one or more embodiments of the invention.

FIG. 25 shows NLP entering of a time of a log entry shorthand according to one or more embodiments of the invention. In FIG. 25, an example is shown of using a natural language processing engine to record a meal that happened four hours earlier where the message is "Pizza 50 g" at 12:06 pm; i.e. four hours before 4:06 pm, the current time shown in FIG. 25.

Figure 26:
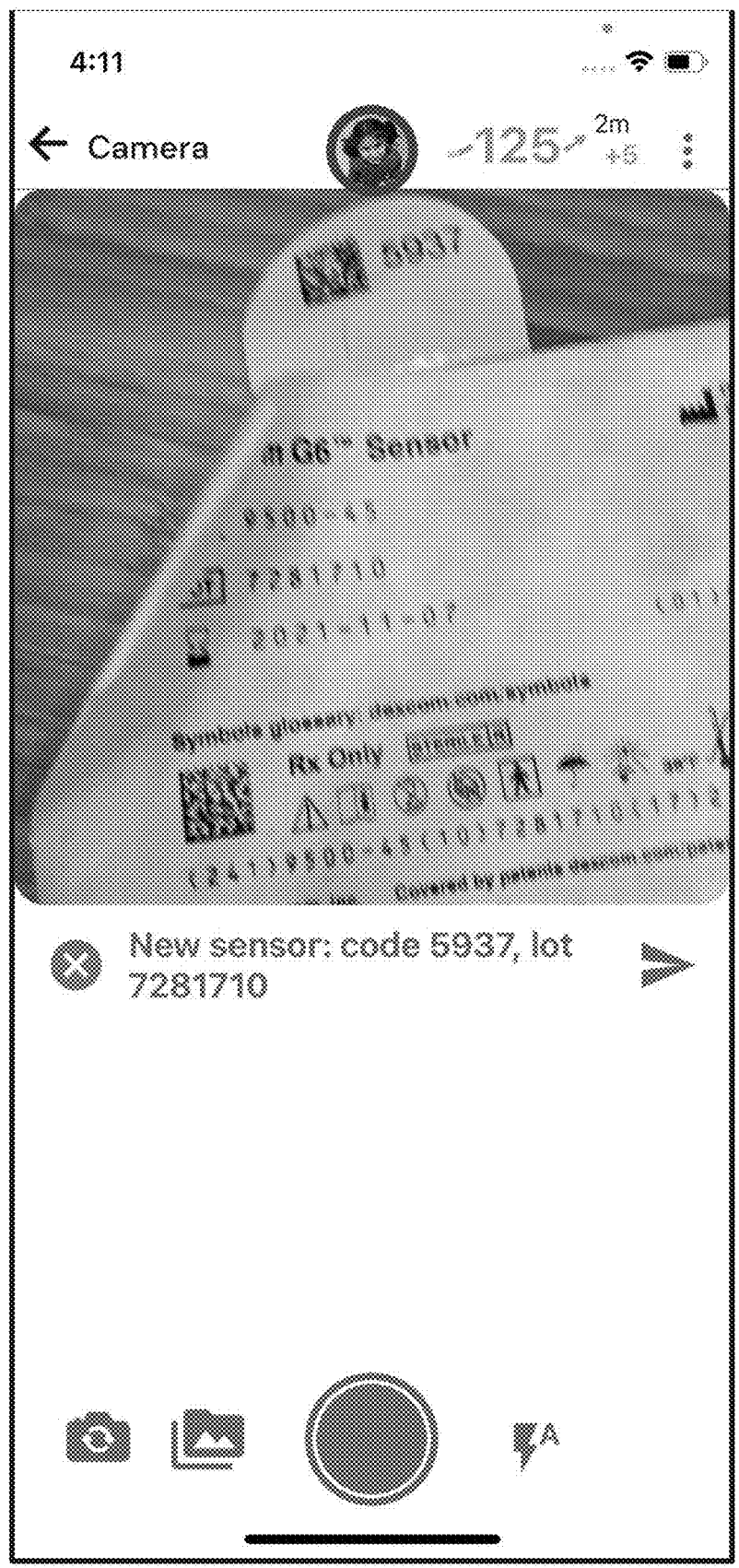
FIG. 26 shows recording a new sensor and code with QR via a camera according to one or more embodiments of the invention.

FIG. 26 shows recording a new sensor and code with QR via a camera according to one or more embodiments of the invention. In FIG. 26, an example shows reading of two separate QR codes for a single logging of a new sensor with both the device lot number and restart activation/calibration code.

Figure 27:
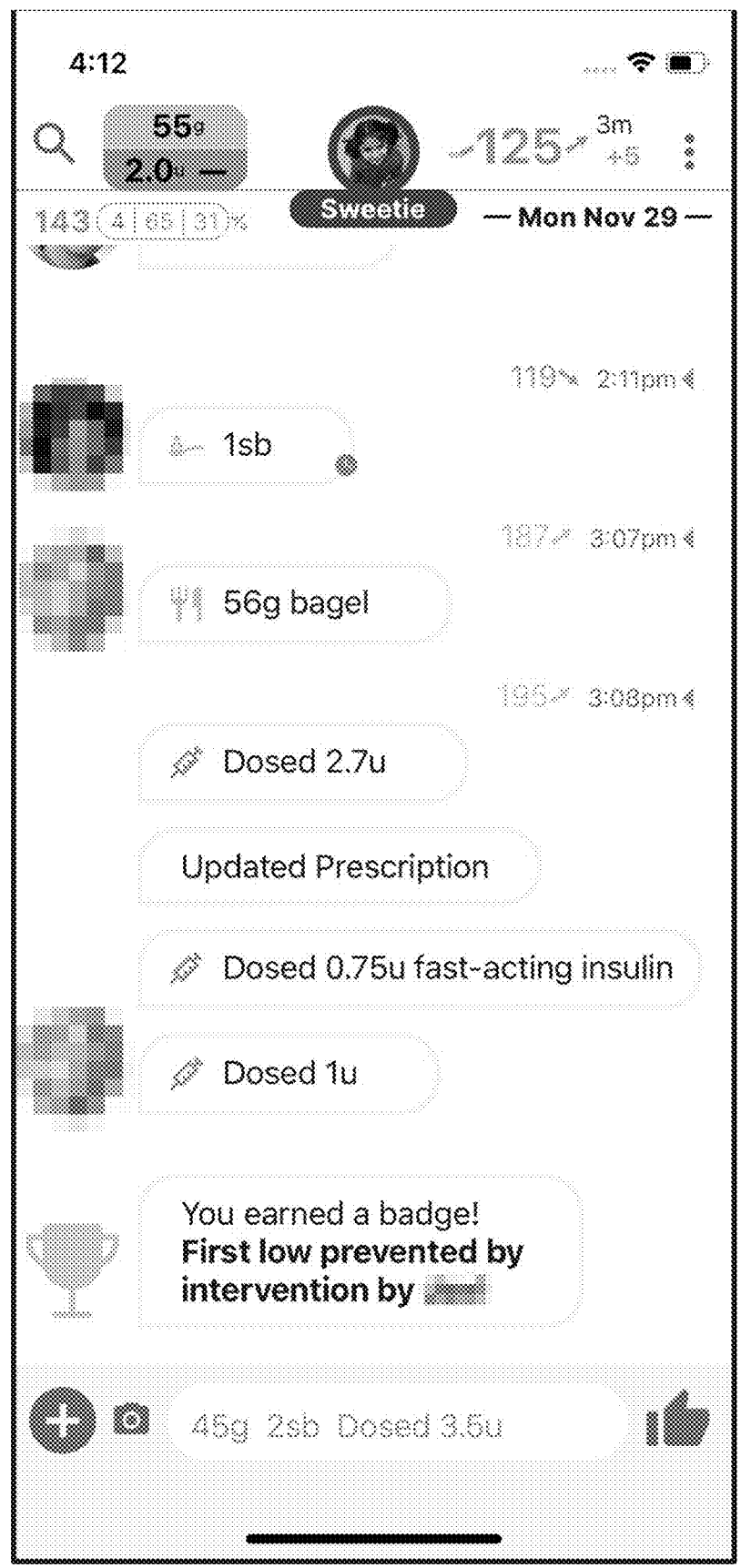
FIG. 27 shows reinforcement trophy badges according to one or more embodiments of the invention.

FIG. 27 shows reinforcement trophy badges according to one or more embodiments of the invention. In FIG. 27, an example is shown of a trophy/badge awarded to a user in the group, or to the group, in recognition of a behavior to be encouraged to increase engagement and enjoyment of the platform.

Figure 28:
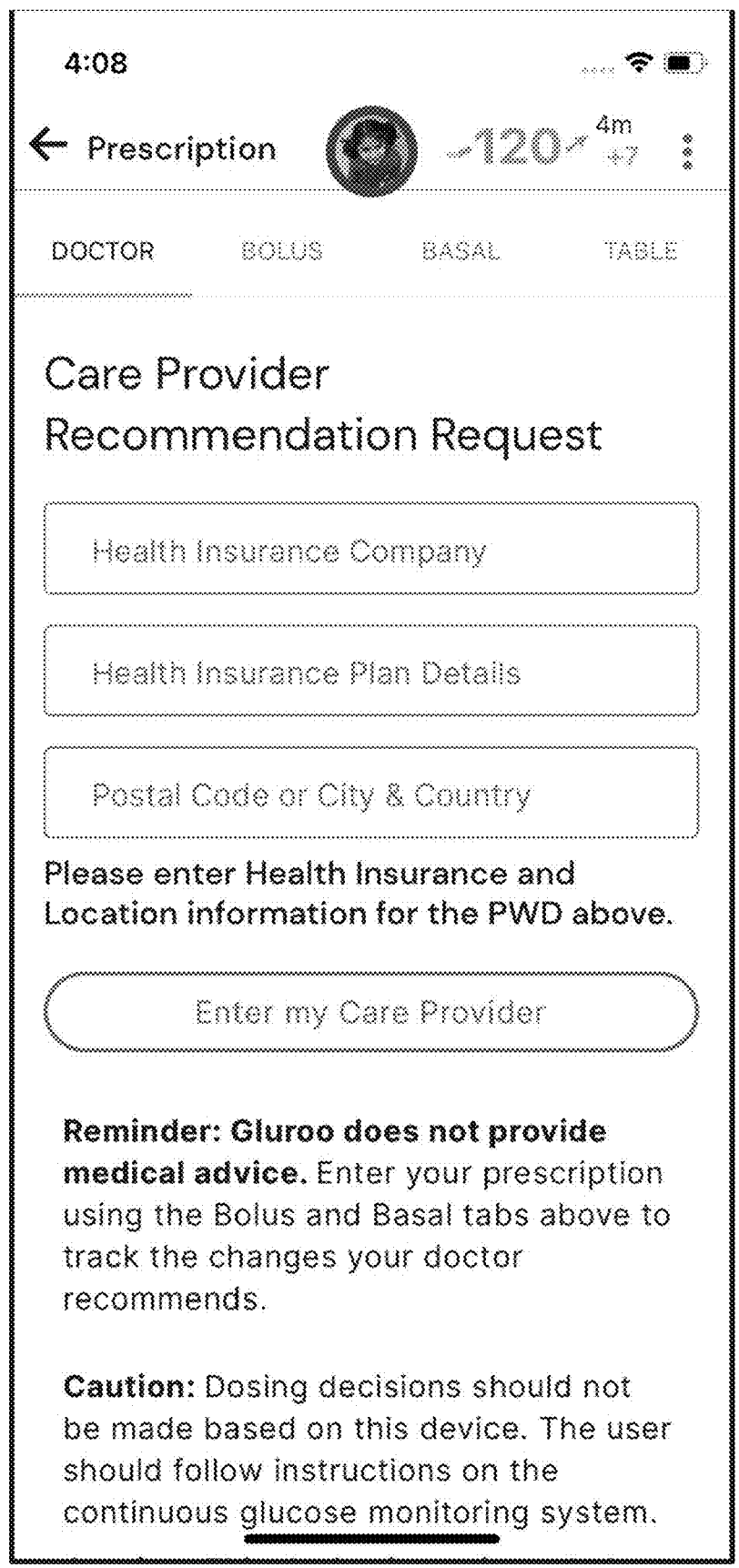
FIG. 28 shows a request for a care provider recommendation according to one or more embodiments of the invention.

FIG. 28 shows a request for a care provider recommendation according to one or more embodiments of the invention. In FIG. 28, an in-app example is shown of an interaction between a member of the group and the system where the member asks the system for a recommendation of a doctor to become a possibly special part of their group. After a doctor is added, then @ references work to send emails to them as part of the system's logging and communications.

Figure 29:
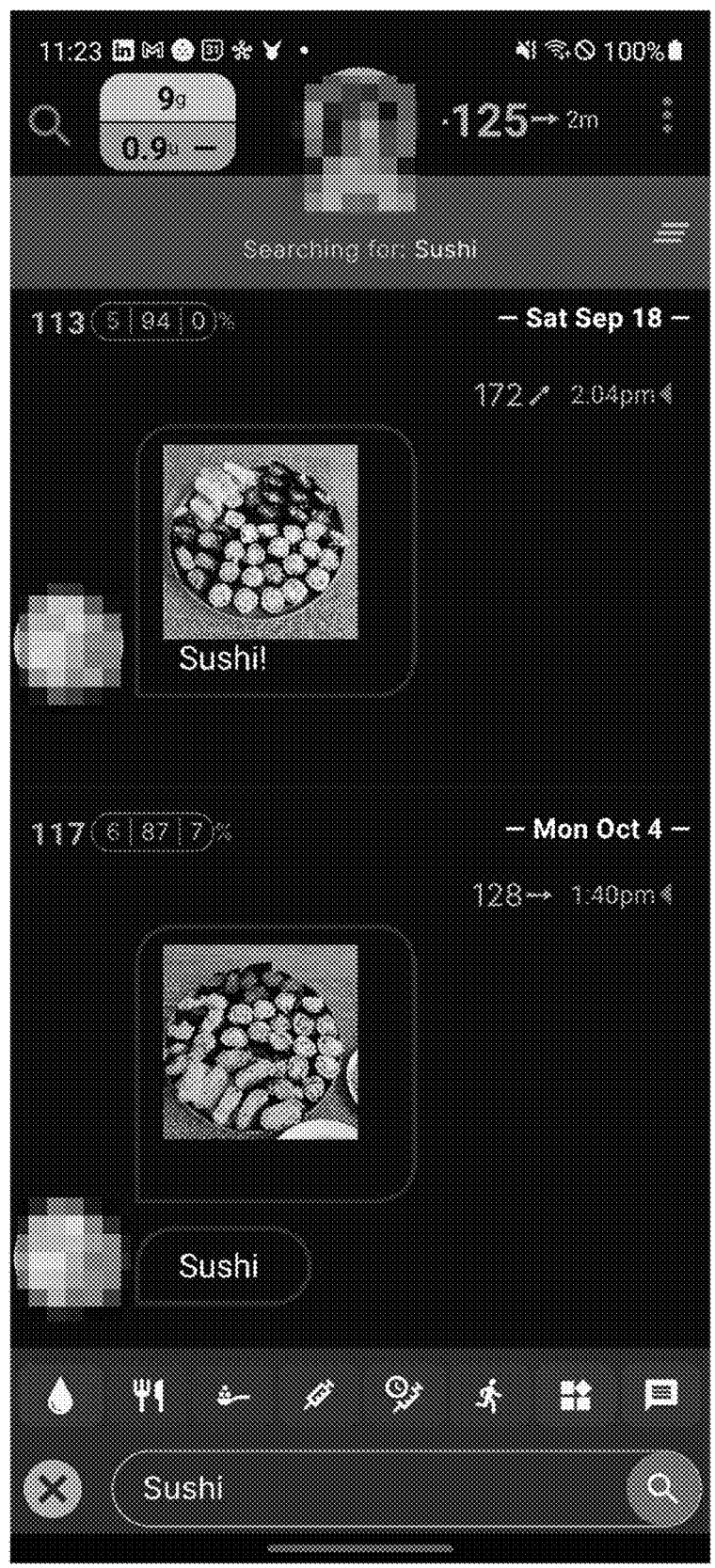
FIG. 29 shows a search interface finding prior sushi meals according to one or more embodiments of the invention.

FIG. 29 shows a search interface finding prior sushi meals according to one or more embodiments of the invention. In FIG. 29, an example output from a search for "Sushi" shows a scrollable log of all the interactions in the temporal vicinity of messages that are related to that search term.

Figure 30:
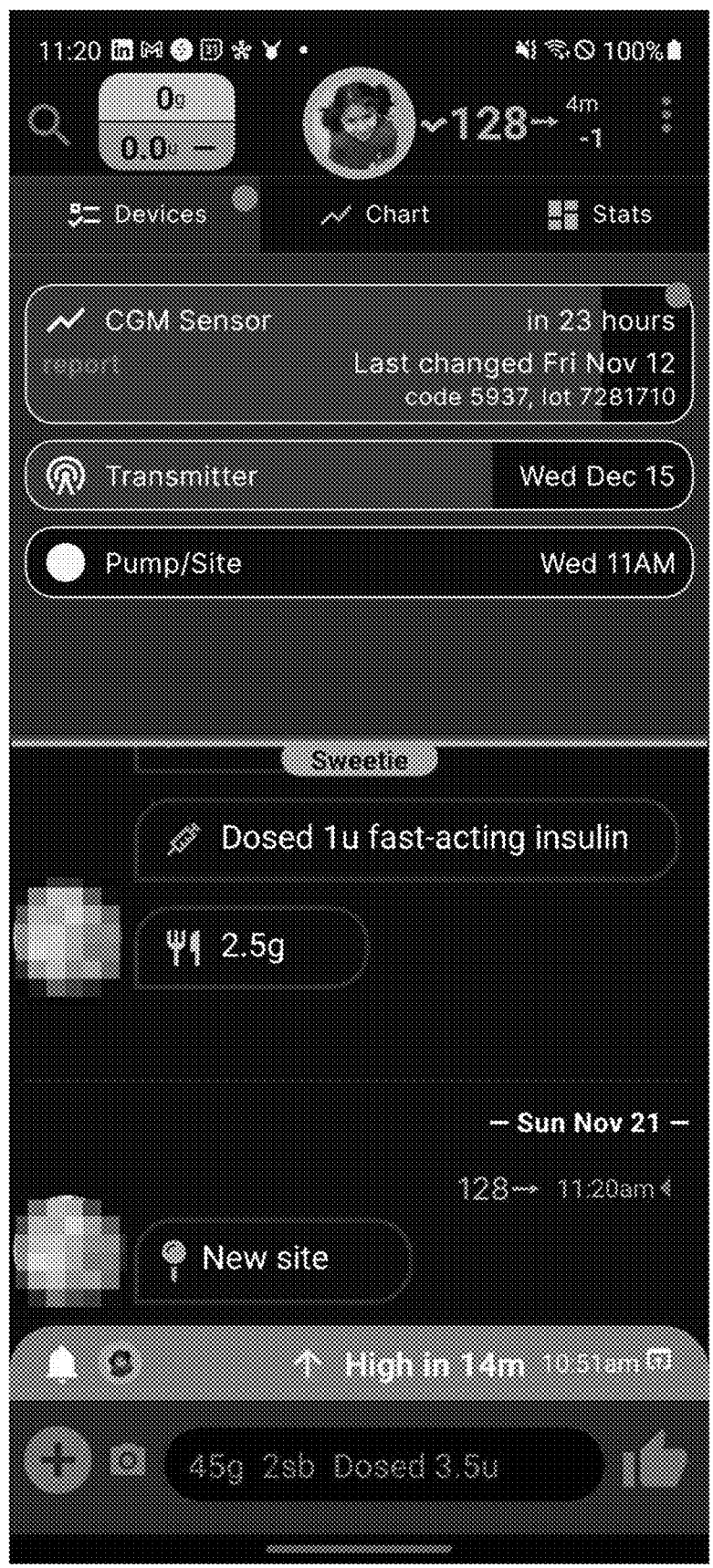
FIG. 30 shows device status and summary with a reporting failure button according to one or more embodiments of the invention.

FIG. 30 shows device status and summary with a reporting failure button according to one or more embodiments of the invention. In FIG. 30, an illustration is provided of the tracking of the various devices that have been logged, and the affordance to report a failed device.

Figure 31:
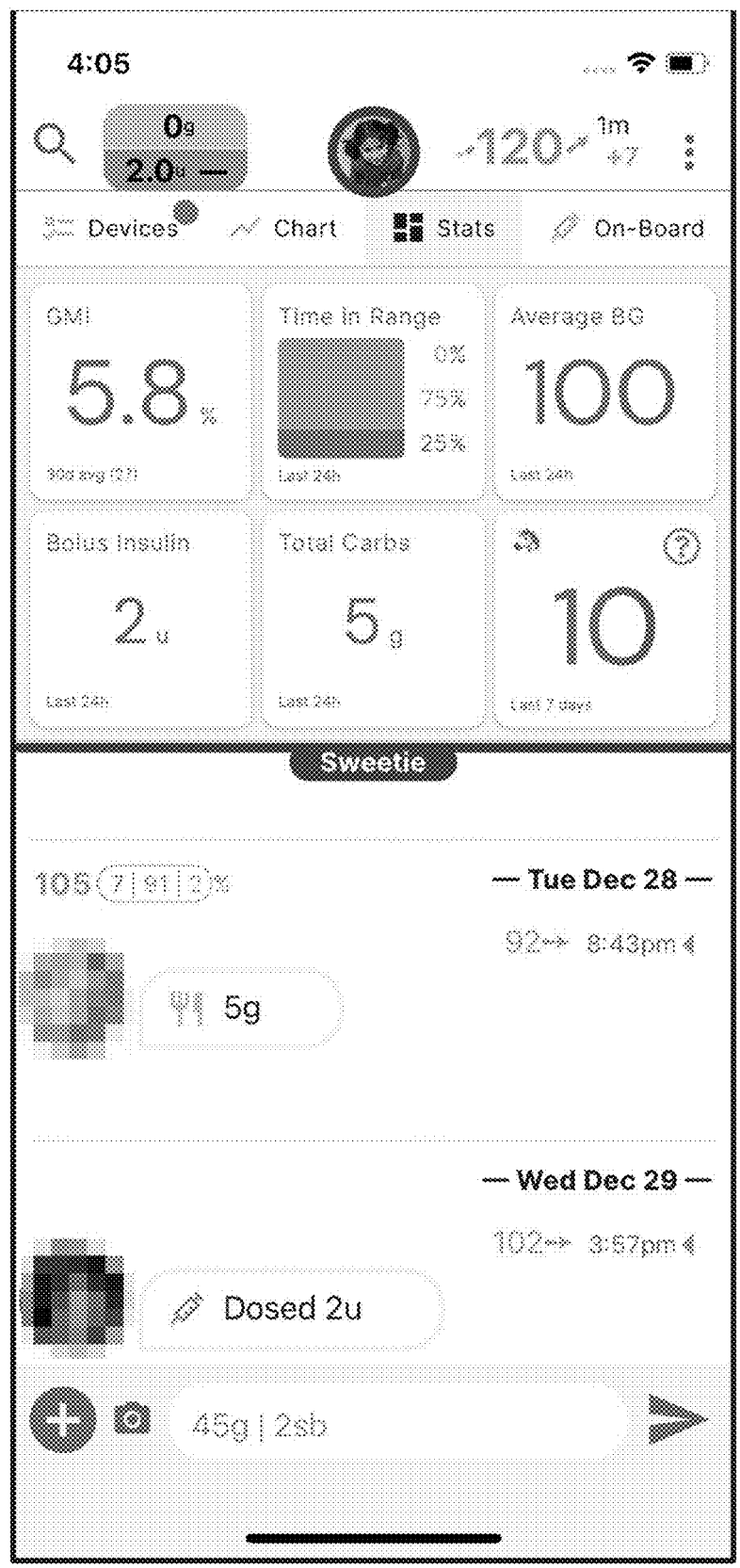
FIG. 31 shows summary statistics according to one or more embodiments of the invention.

FIG. 31 shows summary statistics according to one or more embodiments of the invention. In FIG. 31, an illustration is provided of various derivative statistics based on historical logging and sensor readouts, in this case of a diabetes or other health condition.

Figure 32:
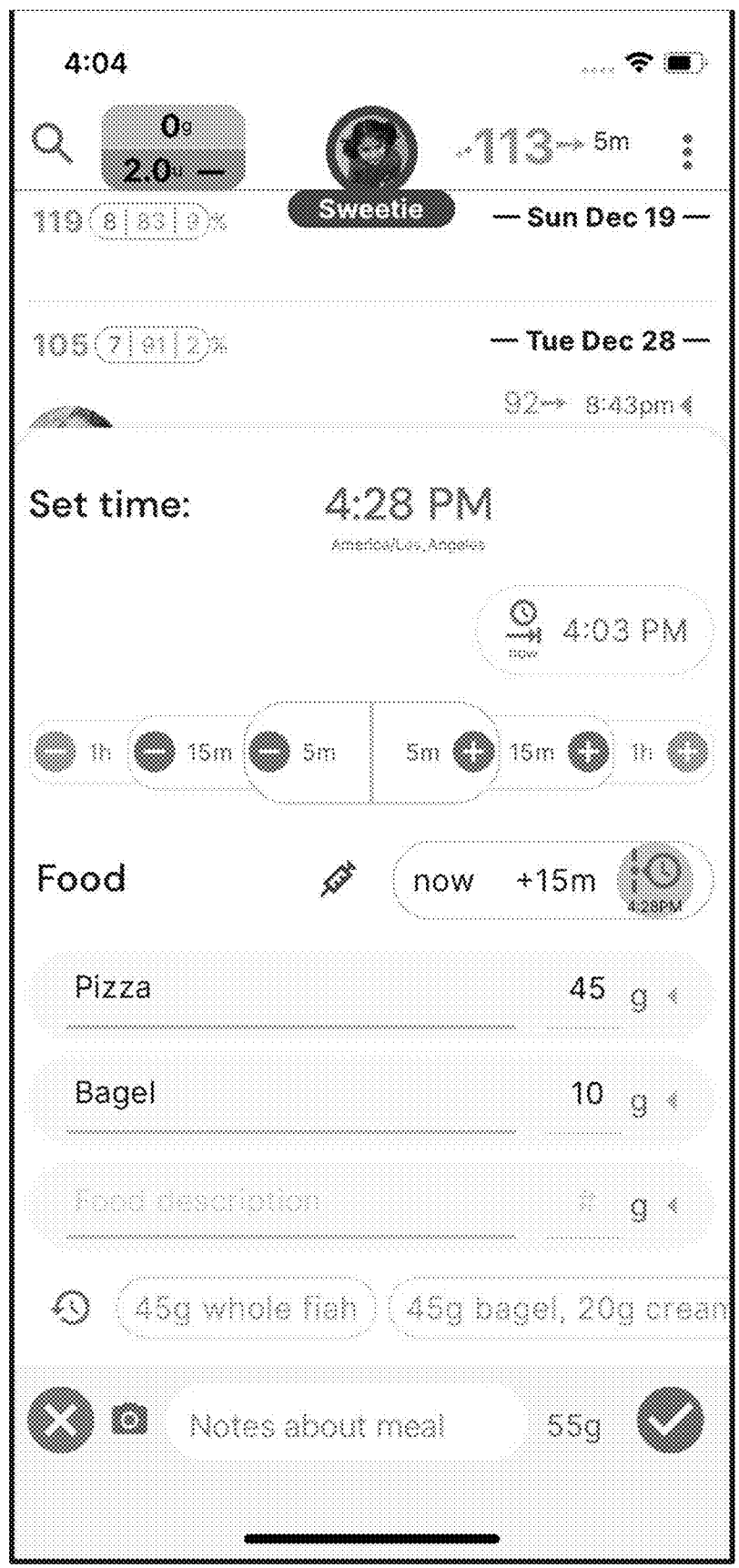
FIG. 32 shows a user interface for entering food and changing the time of a log entry according to one or more embodiments of the invention.

FIG. 32 shows a user interface for entering food and changing the time of a log entry according to one or more embodiments of the invention. In FIG. 32, an example is shown of entering multiple food items and updating the time to store that entry while entering the items. The top part of the user interface is optional to allow setting the time.

Figure 33:
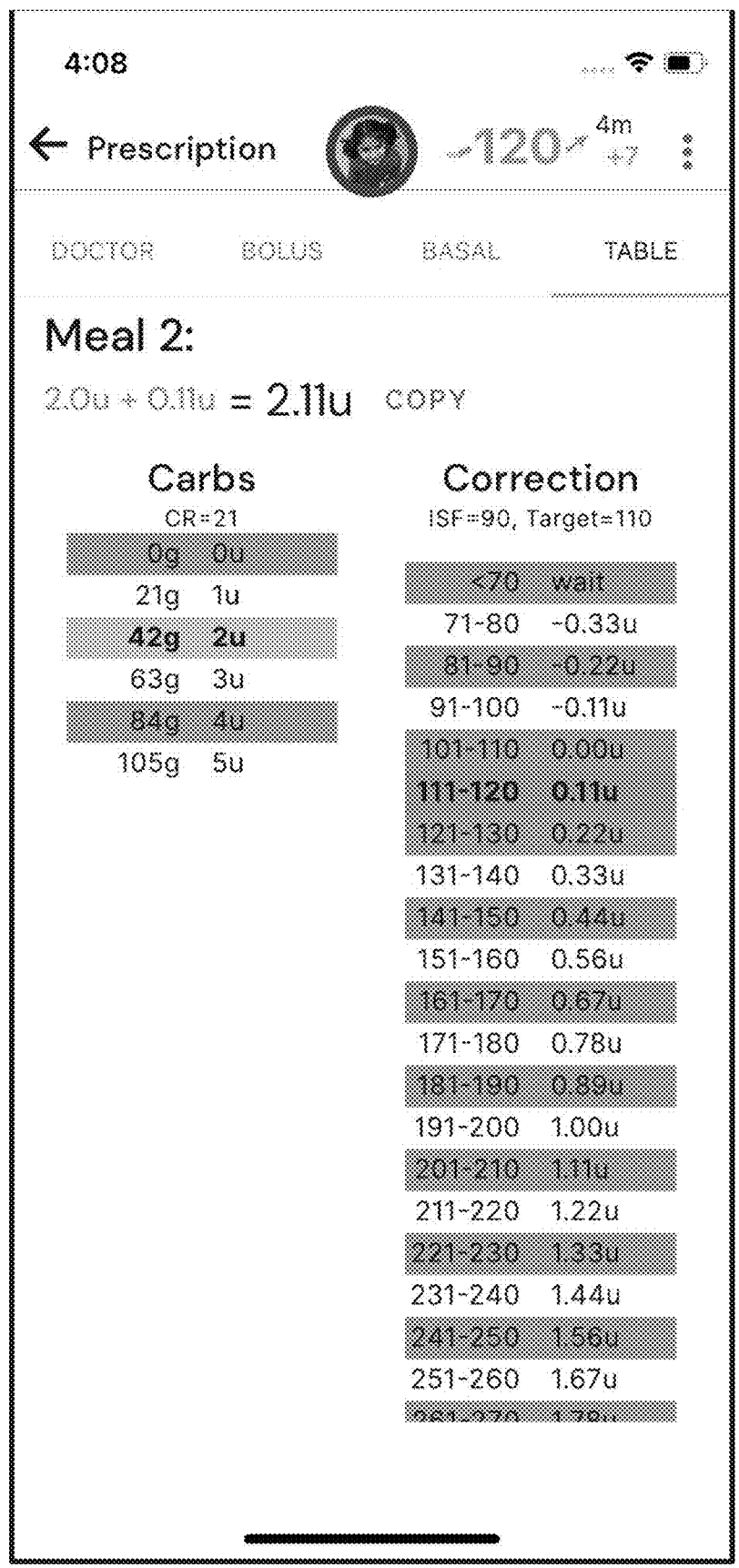
FIG. 33 shows a user interface for a dosing table helper according to one or more embodiments of the invention.

FIG. 33 shows a user interface for a dosing table helper according to one or more embodiments of the invention. In FIG. 33, an example interface shows an insulin dosing table incorporating a dose for both carbohydrate intake as well as a stay-in-range correction. The user's prior logged items can optionally automatically highlight the correct row on the left side for carbs and the user's current blood glucose level can optionally automatically highlight the correct row on the right side for the BGL correction.

Figure 34:
FIG. 34 shows a user interface for entering an insulin dose with a visible calculation according to one or more embodiments of the invention.

FIG. 34 shows a user interface for entering an insulin dose with a visible calculation according to one or more embodiments of the invention. In FIG. 34, an example interface is shown for logging an insulin dose, in this example, showing a calculation of a recommended dose inline following the entered (and possibly approved by a care provider) prescription. Different settings control the level of assistance provided to the user to comply with local regulations regarding medication.

Figure 35:
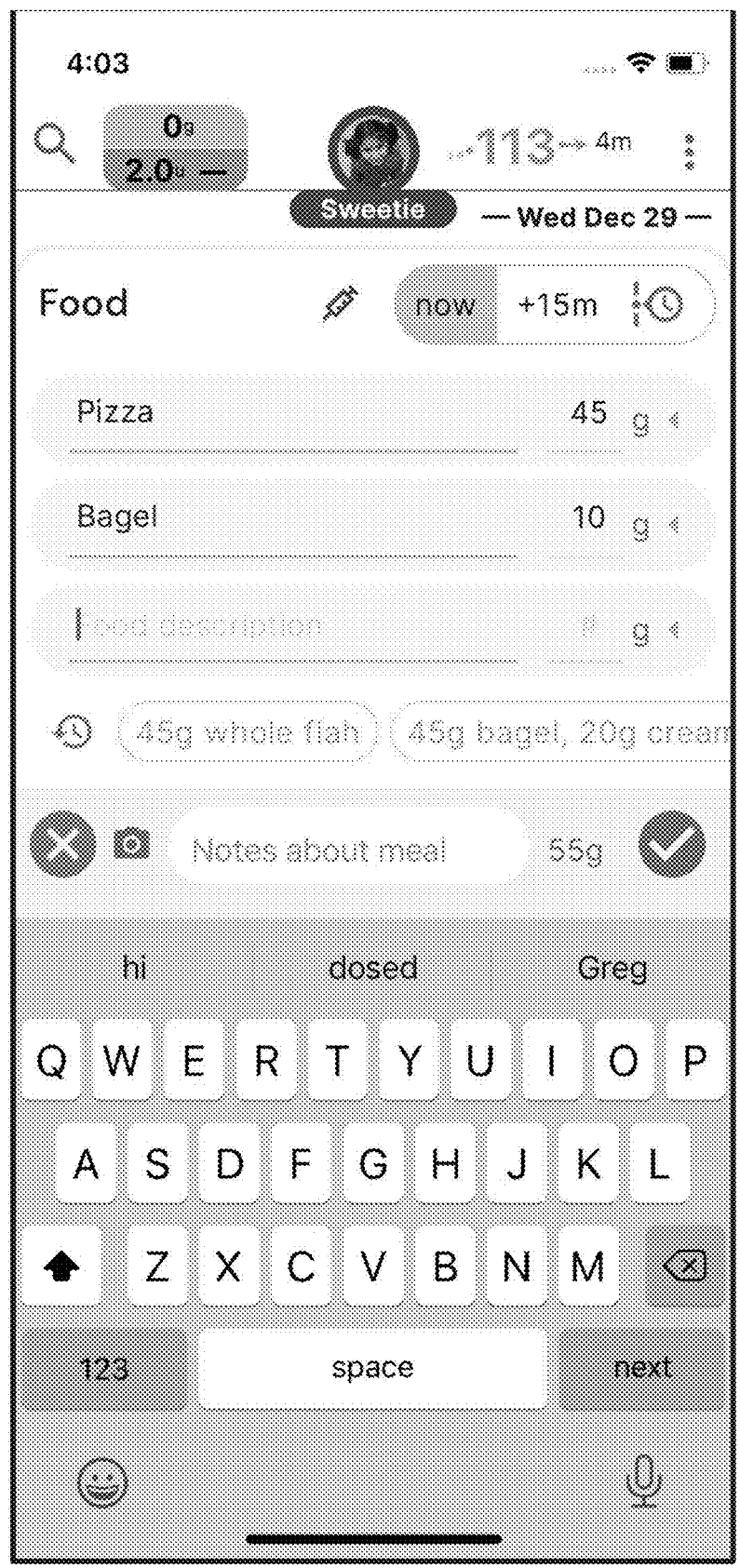
FIG. 35 shows a user interface for entering multiple foods according to one or more embodiments of the invention.

FIG. 35 shows a user interface for entering multiple foods according to one or more embodiments of the invention. In FIG. 35, a user interface is shown that allows a user to enter multiple foods and quantities thereof that have been ingested.

Figure 36:
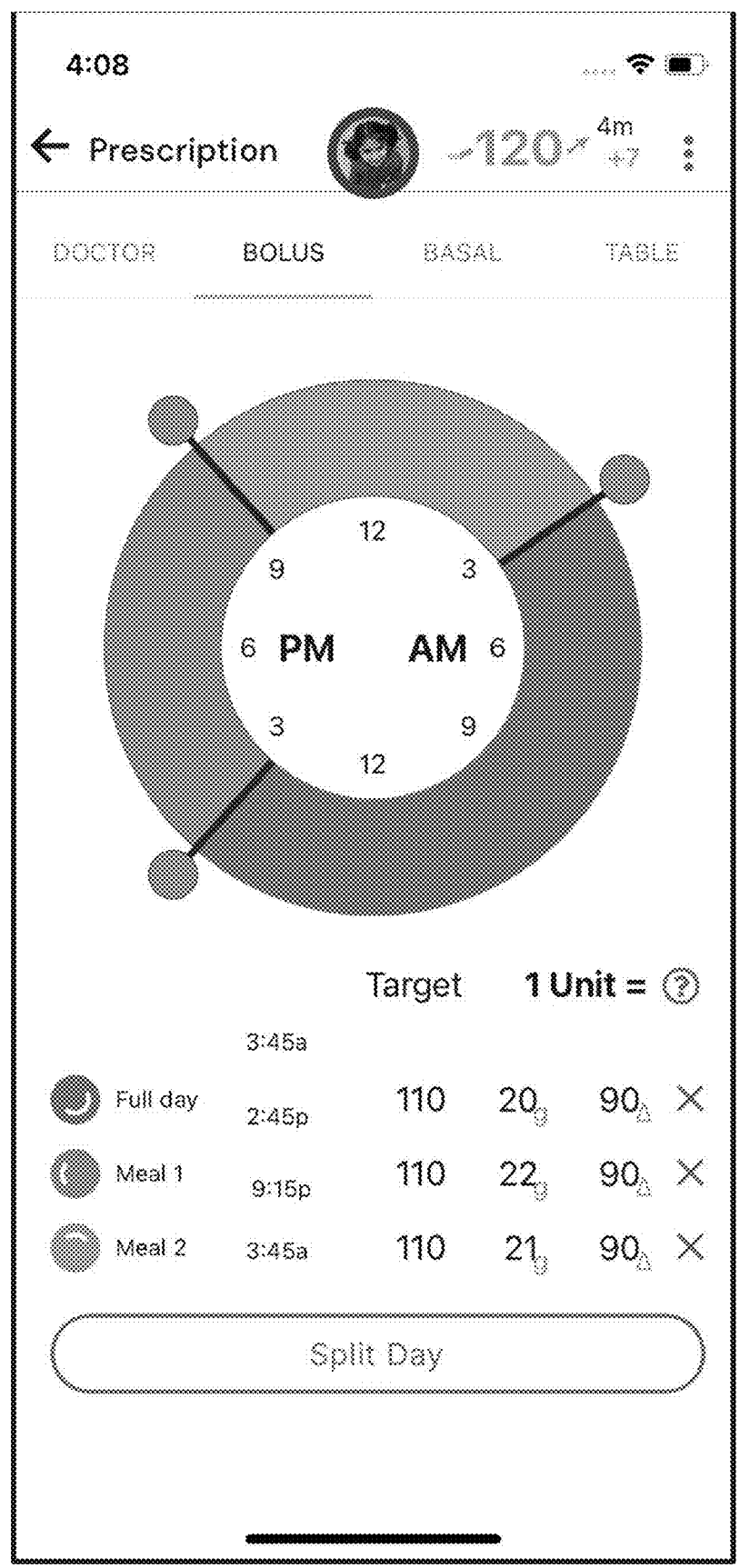
FIG. 36 shows a user interface for entering parameters that vary based on time of day according to one or more embodiments of the invention.

FIG. 36 shows a user interface for entering parameters that vary based on time of day according to one or more embodiments of the invention. In FIG. 36, an example interface shows a graphical mechanism for splitting the hours of the day and allowing the entry of various system parameters based on each separate part of the day. In this example, a 24-hour clock is shown split into three parts, each of which allows the capture of the target Blood Glucose Level, the Carb Ratio for dosing, and the Insulin Sensitivity Factor for dosing corrections.

Figure 37:
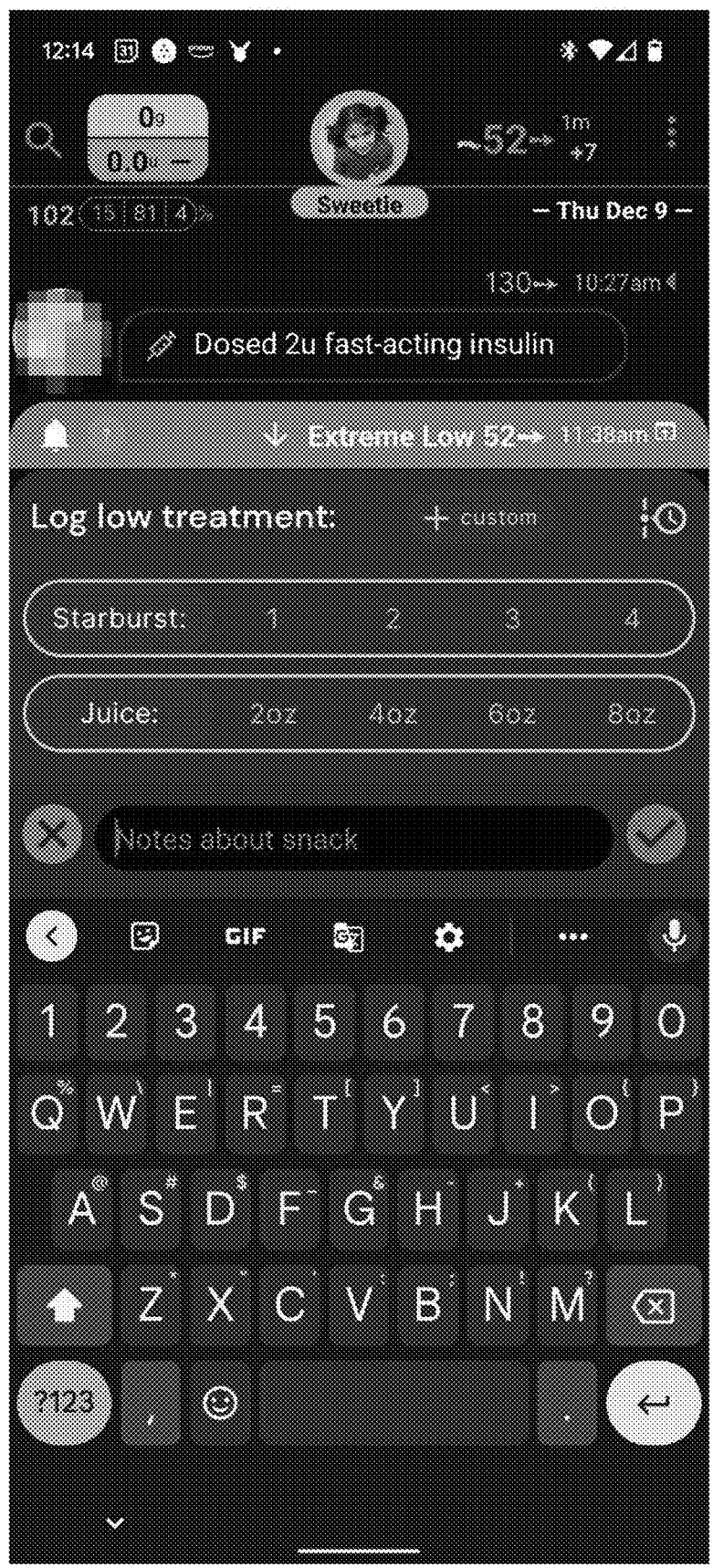
FIG. 37 shows a user interface for logging a low intervention according to one or more embodiments of the invention.

FIG. 37 shows a user interface for logging a low intervention according to one or more embodiments of the invention. In FIG. 37, an example interface is shown for logging a low intervention, e.g. a sugar snack, in an embodiment for diabetes or other health conditions. The set of intervention possibilities is customizable for each group and/or user.

Figure 38:
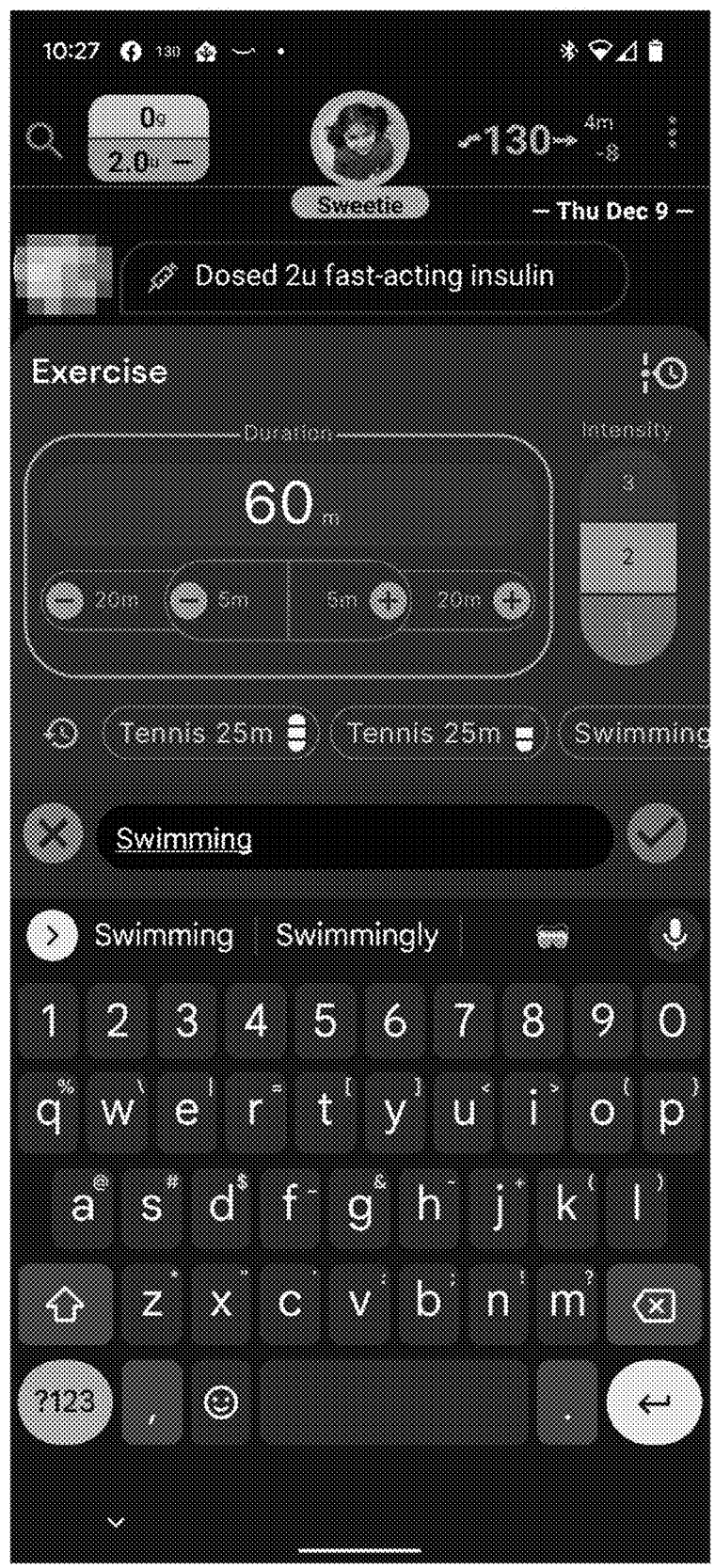
FIG. 38 shows a user interface for logging an exercise according to one or more embodiments of the invention.

FIG. 38 shows a user interface for logging an exercise according to one or more embodiments of the invention. In FIG. 38, an example interface is shown for logging an exercise session in an embodiment for diabetes or other health conditions.

Figure 39:
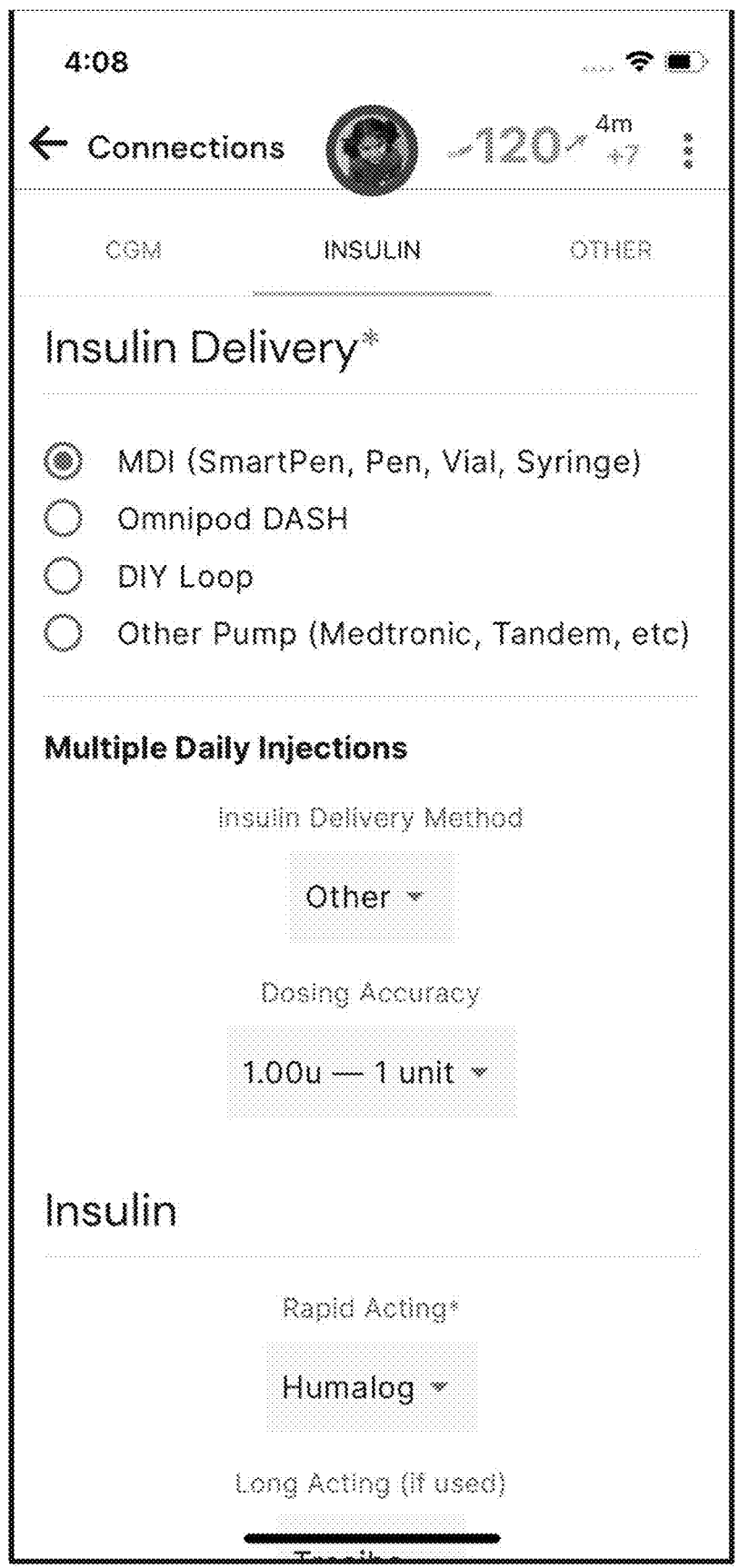
FIG. 39 shows a user interface for configuring operating parameters of the system according to one or more embodiments of the invention.

FIG. 39 shows a user interface for configuring operating parameters of the system according to one or more embodiments of the invention. In FIG. 39, an example interface is shown for configuring group parameters for the treatment regimen that then influences other interfaces. For example, if the dosing accuracy is only whole units, then fractional values are disallowed elsewhere.

Figure 40:
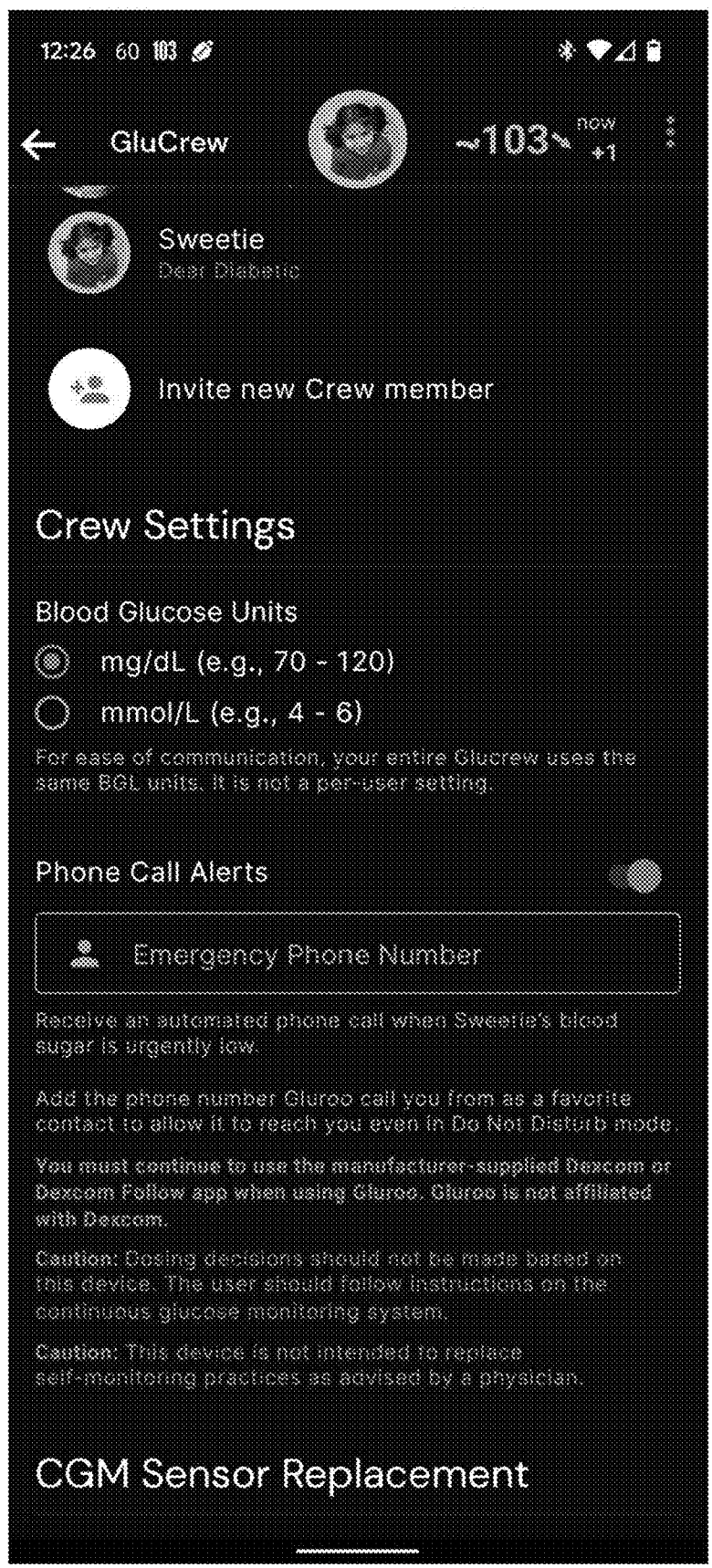
FIG. 40 shows that units on the logs are abstract and parameterized according to one or more embodiments of the invention.

FIG. 40 shows that units on the logs are abstract and parameterized according to one or more embodiments of the invention. In FIG. 40, an illustration shows the setting of the blood glucose units setting. Upon changing this setting, the blood glucose values in the system are instantly updated to the new units—they are stored internally in abstract representation even when entered directly by the user because the type of value is understood.

Exemplary Computer System

Figure 41:
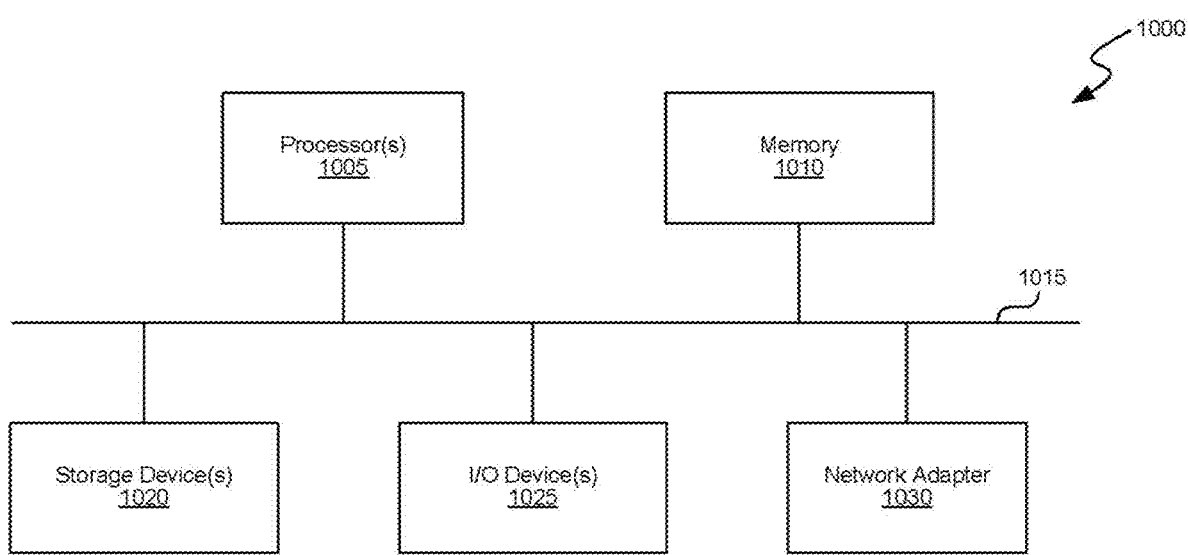
FIG. 41 shows an example computer system in accordance with one or more embodiments of the invention.

FIG. 41 is a block diagram illustrating an example computer system 1000, in accordance with one or more embodiments of the invention. In some embodiments, the computer system 1000 is a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

In some embodiments, the computer system 1000 includes one or more central processing units ("processors") 1005, memory 1010, input/output devices 1025, e.g. keyboard and pointing devices, touch devices, display devices, storage devices 1020, e.g. disk drives, and network adapters 1030, e.g. network interfaces, that are connected to an interconnect 1015. The interconnect 1015 is illustrated as an abstraction that represents any one or more separate physical buses, point to point connections, or both connected by appropriate bridges, adapters, or controllers. In some embodiments, the interconnect 1015 includes, for example, a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus, also called Firewire.

In some embodiments, the memory 1010 and storage devices 1020 are computer-readable storage media that store instructions that implement at least portions of the various embodiments. In addition, in some embodiments, the data structures and message structures are stored or transmitted via a data transmission medium, e.g. a signal on a communications link. Various communications links can be used, e.g. the Internet, a local area network, a wide area network, or a point-to-point dial-up connection. In some embodiments, the computer readable media include computer-readable storage media, e.g. non-transitory media, and computer-readable transmission media.

In some embodiments, the instructions stored in memory 1010 are implemented as software and/or firmware to program the processor 1005 to carry out actions described above. In some embodiments, such software or firmware are initially provided to the computer system 1000 by downloading it from a remote system through the computer system 1000, e.g., via network adapter 1030. The various embodiments introduced herein can be implemented by, for example, programmable circuitry, e.g. one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The description and drawings herein are illustrative and are not to be construed as limiting. Numerous specific details are described to provide a thorough understanding of the disclosure. However, in certain instances, well-known details are not described to avoid obscuring the description. Further, various modifications may be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

The invention claimed is:

1. A method for message-based logging by group, comprising:
identifying, via a processor, one or more participants to a logging system, wherein each user is included in and participates at least one group;
recognizing, via said processor, a participant entering a message via any or all of text, voice, image/photo, video, device sensor, or structured data;
sharing, via said processor, said message with one or more other participants;
identifying, via said processor, one or more metrics for association with said message;

augmenting, via said processor, said message or a subset of messages with timely and contextually relevant metrics and/or most recent readings from biometric sensors stored in a real-time dictionary;

analyzing, via said processor, said message and said metrics in context;

automatically extracting or inferring, via said processor, any structured log entries from ad-hoc or informal communications of the participants and the messages and/or biometric data by either of understanding natural communication, text, voice, and/or images, among participants without requiring a separate step of logging an action or via a custom optimized user interface to create the structured log entry graphically;

wherein said structured log entry comprises a precise structured specification of state or of an interaction or change of state;

wherein fields of the structured log entry include any of a message type corresponding to an intent or impact of the entry, properties of the entry that are specific to a type, natural language notes, and supplemental details; and wherein later lookup of a search term, combines structured log entries of all interactions in the temporal vicinity of messages/biometric data that are related to the search term when presenting the structured log entry in combination with contextual sensor/biometric data;

incorporating, via said processor, said message, its metadata and metrics, and any structured log entry into an internal system representation; and sharing, via said processor, said message, its metadata and metrics, and its structured representation with the one or more other said participants in message and structured formats to compare outcomes or inform reactions or alerts.

2. The method of claim 1, further comprising:
enabling, via said processor, inline real-time visualization of data for each participant; interleaving scrollable inline visualization of sensor data with said messages and metadata; and representing said messages in time-series visualizations to coordinate said message with senor values charted.

3. The method of claim 2, further comprising:
providing, via said processor, time-series predictions of likely forward-looking values for relevant metrics; and
providing inline charts of said time-series predictions configured for backwards and forwards scrolling by said participants.

4. The method of claim 1, further comprising:
suggesting changes to logged messages based on a probability that observed data to date is derived from historically recorded facts.

5. The method of claim 1, further comprising:
generating an alert, via said processor, to call attention to situations that require intervention or interaction;
automatically creating, via said processor, log entries independently of, and on behalf of, the participants, either attributed to the participants or independently attributed; and
searching, via said processor, over structured and unstructured data to find similar past contexts to use to compare outcomes or inform reactions.

6. The method of claim 5, said alert comprising any of a notification on a smart device, a sound, a light blinking, and integrations with home automations or other devices.

7. The method of claim 1, wherein said metrics are determined in connection with any of:
a group for diabetes care having attached sensors that include any of continuous glucose monitor (CGM) readings, finger-prick Bluetooth sensor readings, and watch-based pedometer readings;
a group for trading financial instruments having attached sensors that include financial instrument price; and
a group for system metrics having attached sensors.

8. The method of claim 7, wherein said financial instruments comprise any of instruments related to stock, commodities, bonds, and options.

9. The method of claim 7, wherein said systems comprise any of computer systems, production computing services, nuclear reactors, production lines, and power plants.

10. The method of claim 7, wherein said system metrics comprise any of incoming query rate and CPU load readings.

11. The method of claim 7, wherein a value in a CGM sensor value display is incorporated into metadata of the message entered by the participant.

12. The method of claim 1, further comprising:
coordinating, via said processor, participant interactions via any of peer-to-peer communication and a centralized broker service.

13. The method of claim 1, further comprising:
providing, via the processor, a collection system with which most recent readings are stored in a real-time dictionary for addition to each new message based on temporal proximity.

14. The method of claim 1, further comprising:
analyzing, via said processor, messages using any of regular expressions, language models including part of speech taggers, image or video analysis using artificial intelligence and machine learning including deep learning algorithms, and domain-specific graphical user interfaces customized for collecting relevant structured and unstructured data.

15. The method of claim 1, further comprising:
performing, via said processor, predictions/simulations by biological or historical time-forecast models with parameters learned from any of historical data, time-series forecasting techniques, and neural networks, pattern recognition, and error minimization curve-fitting techniques.

16. The method of claim 1, further comprising:
requiring, via said processor, one or more automatically added metrics or one or more rules for automatically inferring a structured message from natural language, an image, or a video.

17. The method of claim 1, further comprising:
automatically alerting, via said processor, without participant intervention or system provisioning.

18. The method of claim 1, further comprising:
providing, via said processor, system-generated structured log events and messages automatically with participants providing unstructured or partially structured commentary alongside said system-generated log events and messages.

19. The method of claim 1, further comprising:
recording, via said processor, structured log messages alongside contextually relevant automatically annotated metrics while participants interact with a messaging system.

20. The method of claim 1, further comprising:
assigning, via said processor, alerts to a subset of parties eligible to address the alert in response to sensor data and/or configured rules about responsible parties.

21. The method of claim 20, further comprising:
subsequently reassign and escalate alerts to other parties, via said processor, using manual and automatic feedback about a corrective action or lack thereof until an alertable condition is resolved.

22. The method of claim 20, further comprising:
restricting, via said processor, alerts to a single device that directly observes an error condition or broadcasting an alert to all known devices in an undirected fashion.

23. The method of claim 20, further comprising:
limiting an alert to a narrow set of devices/users; and
when said devices/users do not respond, escalating said alert to a next user/device, and repeating until no additional users are available to interact.

24. The method of claim 20, further comprising:
for an urgent condition, alerting everyone simultaneously.

25. The method of claim 20, further comprising:
when a user receives an alert, the user can either dismiss the alert for the user only, for everyone who received the alert or, the user can log a corrective action, wherein logging the corrective action terminates the alert, stops escalation of the alert, and eliminates the alert from devices of everyone who received the alert.

26. The method of claim 20, further comprising:
alerting, via said processor, one or more devices immediately based on which caregivers are predicted via sensors and automatic and manual configurations as most likely to be able to meaningfully and quickly correct an alertable condition.

27. The method of claim 26, further comprising:
based upon feedback about correction of an alertable condition terminating, via said processor, alerts on other devices; and/or
based on feedback about non-correction of an alertable condition re-assigning and escalating an alert, via said processor, to other devices and caregivers to provide said other devices and caregivers a follow-up chance to correct said alertable condition.

28. The method of claim 1, further comprising:
creating, via said processor, alerting aggregation intermediaries;
said alerting aggregation intermediaries collecting all alerts from one or more systems; and
alerting aggregation intermediaries dispatching said alerts.

* * * * *